(12) United States Patent
Ikemoto

(10) Patent No.: US 8,781,679 B2
(45) Date of Patent: Jul. 15, 2014

(54) BICYCLE SUSPENSION CONTROL APPARATUS

(75) Inventor: Hideki Ikemoto, Sakai (JP)

(73) Assignee: Shimano Inc., Osaka (JP)

( * ) Notice: Subject to any disclaimer, the term of this patent is extended or adjusted under 35 U.S.C. 154(b) by 110 days.

(21) Appl. No.: 13/368,103

(22) Filed: Feb. 7, 2012

(65) Prior Publication Data

US 2012/0221202 A1 Aug. 30, 2012

(30) Foreign Application Priority Data

Feb. 28, 2011 (JP) ................................. 2011-043071

(51) Int. Cl.
*G06F 7/00* (2006.01)
*B60G 17/018* (2006.01)

(52) U.S. Cl.
CPC ................................... *B60G 17/018* (2013.01)
USPC .......................................................... 701/37

(58) Field of Classification Search
CPC .................................................... B60G 17/018
USPC .......................................................... 701/37
See application file for complete search history.

(56) References Cited

U.S. PATENT DOCUMENTS

| | | | |
|---|---|---|---|
| 482,696 A | 9/1892 | Rockwell | |
| 3,861,740 A | 1/1975 | Tajima et al. | |
| 4,551,028 A | * 11/1985 | Rowen et al. | ................ 368/204 |
| 6,050,583 A | 4/2000 | Bohn | |
| 6,131,709 A | 10/2000 | Jolly et al. | |
| 6,149,174 A | 11/2000 | Bohn | |
| 6,336,648 B1 | 1/2002 | Bohn | |
| 6,619,684 B2 | 9/2003 | Miyoshi | |
| 8,091,910 B2 | 1/2012 | Hara et al. | |
| 2001/0030408 A1 | 10/2001 | Miyoshi | |
| 2005/0252330 A1 | 11/2005 | Denk | |
| 2009/0102628 A1* | 4/2009 | Takebayashi | ................ 340/432 |
| 2009/0192673 A1 | 7/2009 | Song et al. | |
| 2011/0257841 A1* | 10/2011 | Hara et al. | ..................... 701/37 |
| 2012/0221203 A1* | 8/2012 | Ichida et al. | ..................... 701/37 |
| 2012/0221204 A1* | 8/2012 | Ichida et al. | ..................... 701/37 |

FOREIGN PATENT DOCUMENTS

| | | |
|---|---|---|
| EP | 2 052 960 A2 | 4/2009 |
| EP | 2 309 352 A1 | 4/2011 |
| JP | 61-37514 A | 2/1986 |
| WO | WO-03/022671 A2 | 3/2003 |

OTHER PUBLICATIONS

European Search Report of corresponding EP Application No. 12 15 6995.8 dated Apr. 26, 2012.

* cited by examiner

*Primary Examiner* — Behrang Badii
*Assistant Examiner* — Daniel L Greene
(74) *Attorney, Agent, or Firm* — Global IP Counselors

(57) ABSTRACT

A bicycle suspension control apparatus includes a user operating device and a controller. The controller is configured to set a bicycle suspension having a plurality of operating states to a first operating state in response to a first manual operation of the user operating device. The controller is further configured to set the bicycle suspension to a second operating state in response to a second manual operation of the user operating device. The second manual operation is performed in a different operating manner of the user operating device than the first manual operation.

19 Claims, 19 Drawing Sheets

SHORT PUSH SETTINGS

☐ FRONT/REAR          ☒ FRONT/REAR
  INDEPENDENT            COORDINATED

LSW    FS              RS
       ☒ LOCK          ☒ LOCK
       ☐ HARD          ☐ HARD
       ☐ SOFT          ☐ SOFT

RSW    FS              RS
       ☐ LOCK          ☐ LOCK
       ☐ HARD          ☐ HARD
       ☒ SOFT          ☒ SOFT

[ SELECT ]

FIG. 10

FIRST LONG PUSH SETTINGS

☒ FRONT/REAR          ☐ FRONT/REAR
  INDEPENDENT            COORDINATED

LSW    FS              RS
       ☐ LOCK          ☐ LOCK
       ☒ HARD          ☐ HARD
       ☐ SOFT          ☐ SOFT

RSW    FS              RS
       ☐ LOCK          ☐ LOCK
       ☐ HARD          ☒ HARD
       ☐ SOFT          ☐ SOFT

[ SELECT ]

FIG. 11

FIRST LONG PUSH SETTINGS

☐ FRONT/REAR INDEPENDENT  ☒ FRONT/REAR COORDINATED

LSW  
    FS  
    ☐ LOCK  
    ☒ HARD  
    ☐ SOFT

RS  
    ☐ LOCK  
    ☒ HARD  
    ☐ SOFT

RSW  
    FS  
    ☐ LOCK  
    ☒ HARD  
    ☐ SOFT

RS  
    ☐ LOCK  
    ☐ HARD  
    ☒ SOFT

SELECT

FIG. 12

SECOND LONG PUSH SETTINGS

☒ FRONT/REAR INDEPENDENT  ☐ FRONT/REAR COORDINATED

LSW  
    FS  
    ☐ LOCK  
    ☐ HARD  
    ☒ SOFT

RS  
    ☐ LOCK  
    ☐ HARD  
    ☐ SOFT

RSW  
    FS  
    ☐ LOCK  
    ☐ HARD  
    ☐ SOFT

RS  
    ☐ LOCK  
    ☐ HARD  
    ☒ SOFT

SELECT

S-OPERATION SETTINGS

☐ FRONT/REAR INDEPENDENT   ☒ FRONT/REAR COORDINATED

LSW   FS   RS

☒ LOCK   ☒ LOCK
☐ HARD   ☐ HARD
☐ SOFT   ☐ SOFT

RSW   FS   RS

☐ LOCK   ☐ LOCK
☐ HARD   ☐ HARD
☒ SOFT   ☒ SOFT

SELECT

FIG. 23

D-OPERATION SETTINGS

☒ FRONT/REAR INDEPENDENT   ☐ FRONT/REAR COORDINATED

LSW   FS   RS

☐ LOCK   ☐ LOCK
☒ HARD   ☐ HARD
☐ SOFT   ☐ SOFT

RSW   FS   RS

☐ LOCK   ☐ LOCK
☐ HARD   ☒ HARD
☐ SOFT   ☐ SOFT

SELECT

FIG. 24

D-OPERATION SETTINGS

☐ FRONT/REAR INDEPENDENT   ☒ FRONT/REAR COORDINATED

LSW    FS                RS
       ☐ LOCK            ☐ LOCK
       ☒ HARD            ☒ HARD
       ☐ SOFT            ☐ SOFT

RSW    FS                RS
       ☐ LOCK            ☐ LOCK
       ☒ HARD            ☐ HARD
       ☐ SOFT            ☒ SOFT

SELECT

FIG. 25

T-OPERATION SETTINGS

☒ FRONT/REAR INDEPENDENT   ☐ FRONT/REAR COORDINATED

LSW    FS                RS
       ☐ LOCK            ☐ LOCK
       ☐ HARD            ☐ HARD
       ☒ SOFT            ☐ SOFT

RSW    FS                RS
       ☐ LOCK            ☐ LOCK
       ☐ HARD            ☐ HARD
       ☐ SOFT            ☒ SOFT

SELECT

FIG. 26

T-OPERATION SETTINGS

|  | ☐ FRONT/REAR INDEPENDENT | ☒ FRONT/REAR COORDINATED |
|---|---|---|
| LSW | FS | RS |
|  | ☐ LOCK | ☒ LOCK |
|  | ☒ HARD | ☐ HARD |
|  | ☐ SOFT | ☐ SOFT |
| RSW | FS | RS |
|  | ☐ LOCK | ☒ LOCK |
|  | ☐ HARD | ☐ HARD |
|  | ☒ SOFT | ☐ SOFT |

SELECT

FIG. 27

OPERATION DETERMINATION SETTINGS

DETERMINATION TIME (msec)

T
700
600
500
400
300

SELECT

FIG. 28

BICYCLE SUSPENSION CONTROL APPARATUS

CROSS-REFERENCE TO RELATED APPLICATIONS

This application claims priority under 35 U.S.C. §119 to Japanese Patent Application No. 2011-043071, filed Feb. 28, 2011. The entire disclosure of Japanese Patent Application No. 2011-043071 is hereby incorporated herein by reference.

BACKGROUND

1. Field of the Invention

This invention generally relates to a bicycle suspension control apparatus. More specifically, the present invention relates to a bicycle suspension control apparatus configured to control a bicycle suspension having a plurality of operating states in response to an operation of an operating device.

2. Background Information

Bicycle suspensions are known that are adjustable such that a stiffness of the suspension can be adjusted (e.g., see U.S. Patent Application Publication No. 2009/0192673). The suspension control apparatus disclosed in the above mentioned publication is configured to set a stiffness of a suspension to any one of a plurality of levels using an operating device provided on a handlebar of a bicycle.

SUMMARY

The conventional suspension control apparatus, such as the one mentioned above, uses a switch having a plurality of contacts to accomplish operations for changing an operating state of a suspension. Consequently, the structure of the switch is complex.

One object of the present disclosure is to provide a bicycle suspension control apparatus that can change a suspension to a desired operating state using a switch having a simple structure.

In view of the state of the known technology, a bicycle suspension control apparatus according to a first aspect is provided that comprises a user operating device and a controller. The controller is configured to set a bicycle suspension having a plurality of operating states to a first operating state in response to a first manual operation of the user operating device. The controller is further configured to set the bicycle suspension to a second operating state in response to a second manual operation of the user operating device. The second manual operation is performed in a different operating manner of the user operating device than the first manual operation.

With this suspension control apparatus, the suspension is put into a first operating state by executing a first manual operation of the operating device. Meanwhile, the suspension is put into a second operating state by executing a second manual operation of the operating device that constitutes a different operating method than the first manual operation. Thus, the operating state of the suspension can be changed by means of a first manual operation and a second manual operation that constitute different operating methods. Consequently, simple switches having a single contact can be used. Since the first manual operation and the second manual operation constitute different operating methods, a user can change the suspension to a desired operating state using simple switches having a single contact.

A bicycle suspension control apparatus according to a second aspect is provided according to the first aspect, wherein the controller sets the bicycle suspension to the first operating state based on a first operation time per single operation of the user operating device for the first manual operation and sets the bicycle suspension to the second operating state based on a second operation time per single operation of the user operating device for the second manual operation, with the first and second operation times being different. With this aspect, a bicycle suspension can be changed between a first operating state and a second operating state by operating a single operating device with a first manual operation and a second manual operation having different operation times.

A bicycle suspension control apparatus according to a third aspect is provided according to the second aspect, wherein the controller is further configured such that the first operation time of the first manual operation is shorter than the second operation time of the second manual operation.

A bicycle suspension control apparatus according to a fourth aspect is provided according to the third aspect, wherein the controller is further configured to control the bicycle suspension to a third operating state in response to a third manual operation having a third operation time that is different from the first and second operation times of the first and second manual operations. With this aspect, a bicycle suspension can be changed among a first operating state, a second operating state, and a third operating state by operating a single operating device with a first manual operation, a second manual operation, and a third operation having different operation times.

A bicycle suspension control apparatus according to a fifth aspect is provided according to the fourth aspect, wherein the controller is further configured such that the third operation time of the third operation is longer than the first operation time of the first manual operation and shorter than the second operation time of the second manual operation.

A bicycle suspension control apparatus according to a sixth aspect is provided according to the first aspect, wherein the controller sets the bicycle suspension to the first operating state based on a first operation count per prescribed amount of time of the user operating device for the first manual operation and sets the bicycle suspension to the second operating state based on a second operation count per prescribed amount of time of the user operating device for the second manual operation, with the first and second operation counts being different.

A bicycle suspension control apparatus according to a seventh aspect is provided according to the sixth aspect, wherein the controller is further configured such that the first operation count of the first manual operation is smaller than the second operation count of the second manual operation.

A bicycle suspension control apparatus according to an eighth aspect is provided according to the seventh aspect, wherein the controller is further configured to control the bicycle suspension to a third operating state in response to a third operation having a third operation count that is different from the first and second operation counts of the first and second manual operations. With this aspect, a bicycle suspension can be changed among a first operating state, a second operating state, and a third operating state by operating a single operating device with a first manual operation, a second manual operation, and a third operation having different operation counts.

A bicycle suspension control apparatus according to a ninth aspect is provided according to the eighth aspect, wherein the controller is further configured such that the third operation count of the third operation is larger than the first operation time of the first manual operation and smaller than the second operation time of the second manual operation A bicycle suspension control apparatus according to a tenth aspect is provided according to any one of the fourth, fifth, eighth, and ninth aspects, wherein the controller is further configured such that the third operating state is a state that is different from both the first operating state and the second operating state. With this aspect, a bicycle suspension can be changed among three different operating states by executing three operations having different operation times or operation counts.

A bicycle suspension control apparatus according to an eleventh aspect is provided according to any one of the first to tenth aspects, wherein the controller is further configured such that the first operating state is a state in which the suspension cannot expand and contract and the second operating state is a state in which the suspension can expand and contract. With this aspect, the suspension is put into a locked state in which it cannot expand and contract with a first manual operation and the suspension is put into a free state in which it can expand and contract with a second manual operation having a different operation time or operation count.

A bicycle suspension control apparatus according to a twelfth aspect is provided according to any one of the first to tenth aspects, wherein the controller is further configured such that the first operating state is a state in which the suspension is free to expand and contract and the second operating state is a state in which the suspension locked to prevent expansion and contraction. With this aspect, the suspension is put into a free state in which it can expand and contract with a first manual operation and the suspension is put into a locked state in which it cannot expand and contract with a second manual operation having a different operation time or operation count.

With this bicycle suspension control apparatus, the operating state of the suspension can be changed by means of a first manual operation and a second manual operation that constitute different operating methods. Consequently, simple switches having a single contact can be used. Even though simple switches, e.g., single-contact switches, are used, a user can change a suspension to a desired operating state.

BRIEF DESCRIPTION OF THE DRAWINGS

Referring now to the attached drawings which form a part of this original disclosure:

FIG. 10 is a schematic view of a setting screen for standard settings of the switches when a coordinated mode has been selected in the first embodiment.

FIG. 11 is a schematic view of a first setting screen for long push switch settings in the first embodiment and indicates that an independent mode is selected.

FIG. 12 is a schematic view of a first setting screen for long push switch settings in the first embodiment and indicates that a coordinated mode is selected.

FIG. 13 is a schematic view of a second setting screen for long push switch settings in the first embodiment and indicates that an independent mode is selected.

FIG. 14 is a schematic view of a second setting screen for long push switch settings in the first embodiment and indicates that a coordinated mode is selected.

FIG. 15 is a schematic view of a switch long push time setting screen in the first embodiment;

FIG. 23 is a schematic showing an S operation setting screen for the switches in the second embodiment and indicates that a coordinated mode is selected;

FIG. 24 is a schematic showing a D-operation setting screen for the switches in the second embodiment and indicates that an independent mode is selected;

FIG. 25 is a schematic showing a D-operation setting screen for the switches in the second embodiment and indicates that a coordinated mode is selected;

FIG. 26 is a schematic showing a T-operation setting screen for the switches in the second embodiment and indicates that an independent mode is selected;

FIG. 27 is a schematic showing a T-operation setting screen for the switches in the second embodiment and indicates that a coordinated mode is selected; and FIG. 28 is a schematic showing an operation time setting screen for the switches in the second embodiment.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
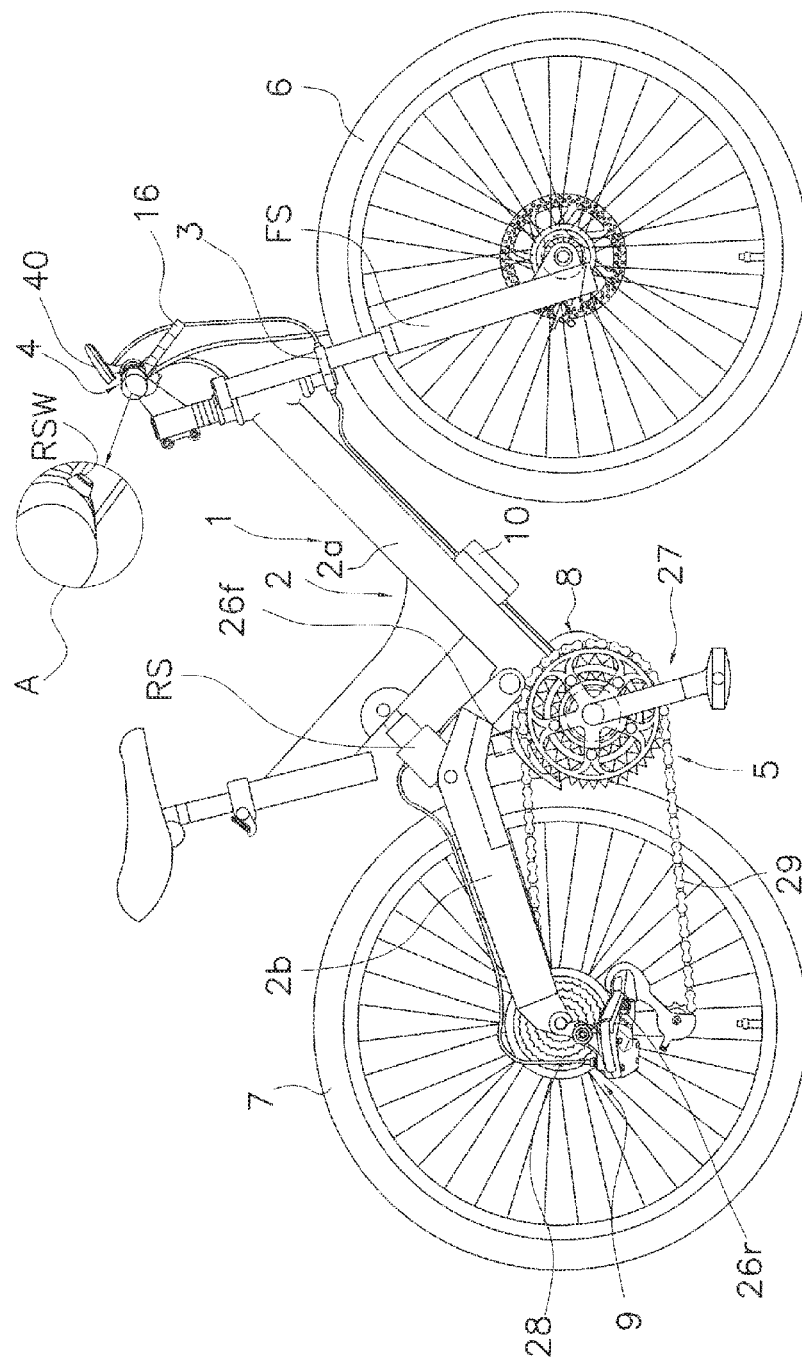
FIG. 1 is a side elevational view of a bicycle that is equipped with a bicycle suspension control apparatus in accordance with a first embodiment.

FIG. 1 shows a bicycle according to an embodiment of the present invention that has a plurality of suspensions. The bicycle is, for example, a mountain bike. The bicycle has a frame 1 on which are provided a front wheel 6, a rear wheel 7, and a drive unit 5 that includes a front electric powered transmission device 8 and a rear electric powered transmission device 9. The frame 1 comprises a frame body 2, a front fork 3, and a handlebar unit 4. The frame body 2 has a frame main body 2a and a swing arm 2b coupled to a rear section of the frame main body 2a such that it can pivot freely. A rear suspension RS is provided between the frame main body 2a and the swing arm 2b. The front fork 3 has a front suspension FS. Each of the front suspension FS and the rear suspension RS is configured such that it can assume any one of three operating states: a hard state, a soft state, and a locked state. The hard state and the soft state are free states in which the front suspension FS or the rear suspension RS can expand and contract. The locked state is a state in which the front suspension FS or rear suspension RS cannot expand and contract. The term "a locked state" in which a suspension cannot expand and contract, as used herein, encompasses a state in which a suspension is prohibited from expanding and contracting but still may expand and contract in a limited situation e.g. by a separate blow-off structure as well as a state in which a suspension is completely prohibited from expanding and contracting. The free state is also called a "lock-released state." The operating state of a suspension is also called a "setting state" of the suspension.

The front suspension FS and the rear suspension RS are configured such that the operating states thereof can be controlled using electricity. Each of the front suspension FS and the rear suspension RS includes a motor and a solenoid or other actuator. The operating state of the front suspension FS or the rear suspension RS can be changed by operating the actuator of the front suspension FS or the rear suspension RS and controlling a valve provided inside the front suspension FS or the rear suspension RS.

The front electric powered transmission device 8 has an electric powered derailleur 26f and a crank assembly 27. The rear electric powered transmission device 9 has an electric powered rear derailleur 26r and a cassette sprocket 28. A chain 29 is arranged across the crank assembly 27 and the cassette sprocket 28. The front wheel 6 is attached to a lower portion of the front fork 3. The rear wheel 7 is attached to a rearward portion of the swing arm 2b.

An electric power supply device 10 serving as an electric power source for the front electric powered transmission device 8, the rear electric powered transmission device 9, the front suspension FS, and the rear suspension RS is attached to the frame body 2.

Figure 2:
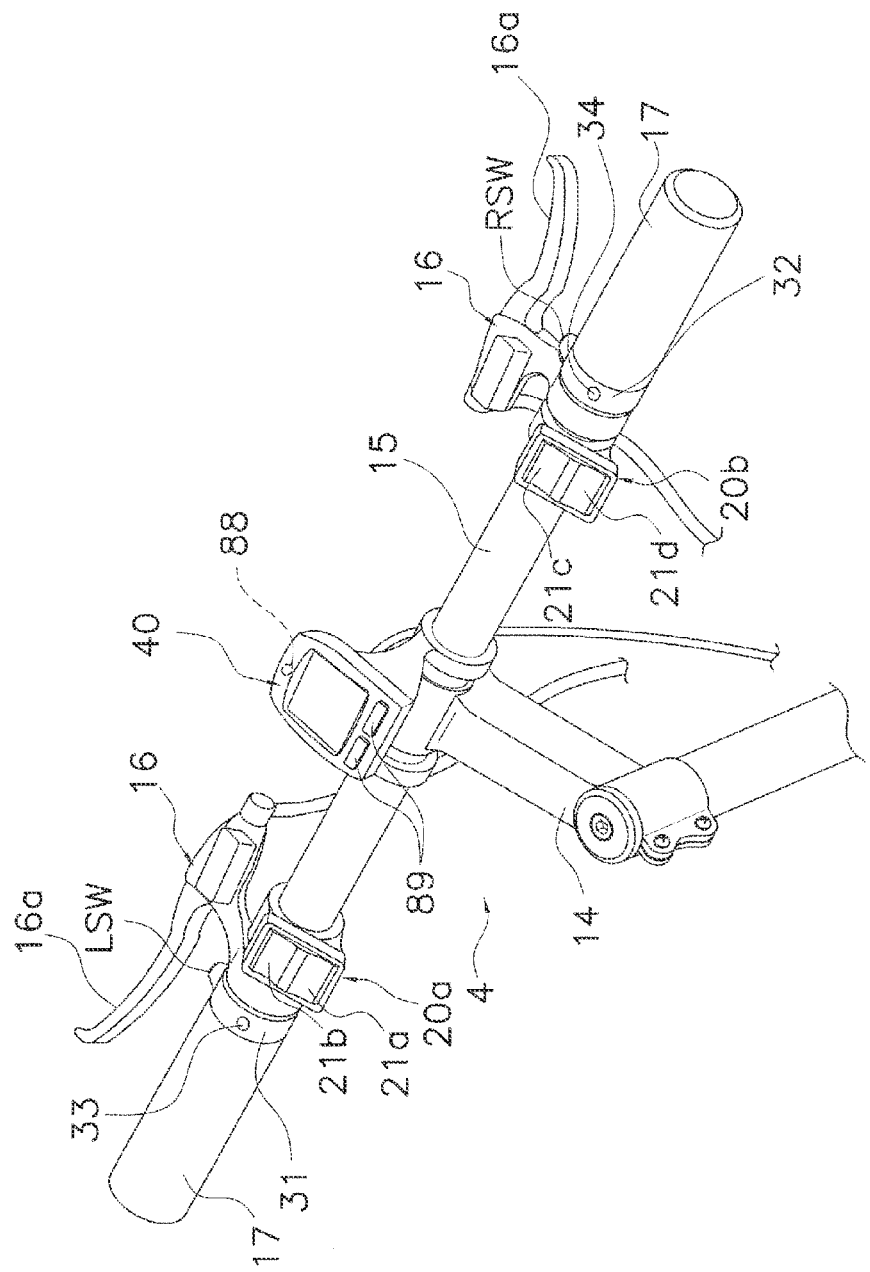
FIG. 2 is a perspective view of a handlebar unit of the bicycle shown in FIG. 1.

As shown in FIG. 2, the handlebar unit 4 has a handlebar stem 14 fixed to an upper portion of the front fork 3 and a handlebar 15 that is fixed to the handlebar stem 14. A brake lever 16 and a grip 17 are attached at each of both ends of the handlebar 15. A first switch LSW or a second switch RSW is provided between the brake lever 16 and the grip 17 at each end of the handlebar 15. The first switch LSW and the second switch RSW are provided for switching the operating states of the front suspension FS and the rear suspension RS. The first switch LSW and the second switch RSW are examples of operating devices.

The left switch LSW is arranged on a left side of the handlebar 15 when one is facing in a forward movement direction of the bicycle. The right switch RSW is arranged on a right side of the handlebar 15 when one is facing in a forward movement direction of the bicycle. Hereinafter, the first switch LSW will be called the "left switch LSW" and the second switch RSW will be called the "right switch RSW." The left switch LSW and the second switch LSW are switches that can be operated in a particular direction. In this embodiment the switches are push button switches. The left switch LSW and the second switch RSW are single contact switches.

Although in this embodiment the left switch LSW and the second switch RSW are push button switches, it is acceptable if the left switch LSW and the second switch RSW are sliding switches that operate by sliding an operating piece or lever switches that operate by changing the angle of a lever-like operating piece.

Near each of the brake levers 16 is provided a front gear shifting unit 20a for operating the front electric powered transmission device 8 and a rear gear shifting unit 20b for operating the rear electric powered transmission device 9. With this embodiment, the left switch LSW and the front gear shifting unit 20a are arranged on opposite sides of a mounting portion of the left-hand brake lever 16, and the right switch RSW and the rear gear shifting unit 20b are arranged on opposite sides of a mounting portion of the right-hand brake lever 16.

Figure 3:
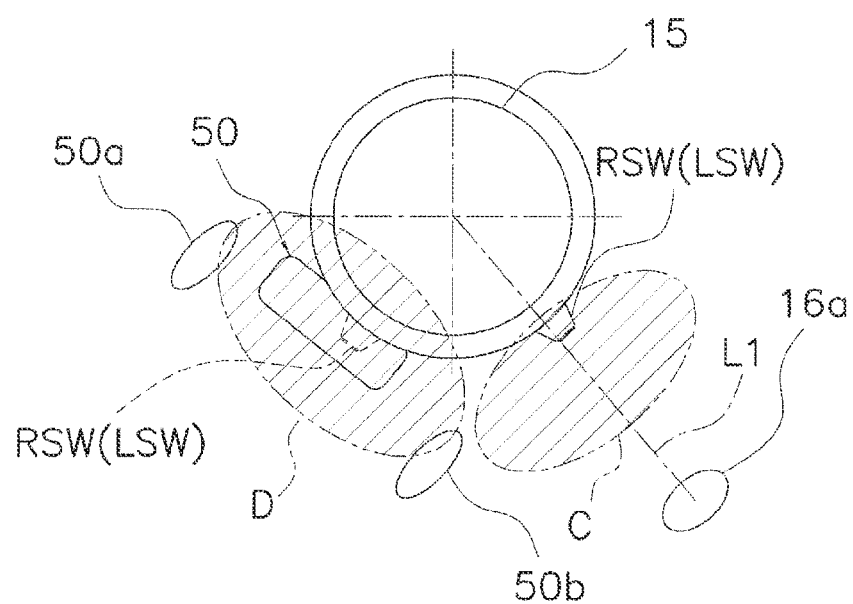
FIG. 3 is a schematic side elevational view of the handlebar unit shown in FIG. 2.

The left switch LSW and the right switch RSW are preferably arranged in a region C indicated with hatching in FIG. 3. The region C lies between a lever body 16a of the brake lever 16 and the handlebar 15. More specifically, the switches are preferably arranged near a line L1 joining a center of the brake lever 16 and a center of the handlebar 15. The region C is positioned frontward and downward of the handlebar 15. The region C serves as a region in which a space can be secured between the lever body 16a and the handlebar 15 even when the lever body 16a is pivoted toward the handlebar 15 during a brake operation. As a result, a different finger of the hands that operate each of the lever bodies 16a can be used to operate the left switch LSW and the right switch RSW in order to change an operating state of each of the suspensions. Additionally, since the left switch LSW and the right switch RSW are arranged in positions near a plane in which the brake levers pivot, an operating state of a suspension can be changed swiftly while fingers remain engaged with a brake lever.

Mistaken operations of the left switch LSW and the right switch RSW can be prevented by configuring the switches to operate in different directions than the operating directions of the brake levers 16. For example, the left switch LSW and the right switch RSW can be configured to operate perpendicularly to the operating directions of the brake levers 16.

In this embodiment, as shown in FIG. 2, the left switch LSW is mounted to a first switch bracket 31 that can be attached to the handlebar 15. A first notification unit 33 is provided on the first switch bracket 31. The first notification unit 33 comprises, for example, one or a plurality of LEDs (light emitting diodes).

The right switch RSW is mounted to a second switch bracket 32 that can be attached to the handlebar 15. A second notification unit 34 is provided on the second switch bracket 32. The second notification unit 34 comprises, for example, one or a plurality of LEDs (light emitting diodes).

The first notification unit 33 and the second notification unit 34 serve to indicate operating states of the front suspension FS and the rear suspension RS. For example, each of the first notification unit 33 and the second notification unit 34 might indicate an operating state of one or the other of the front suspension FS and the rear suspension RS. More specifically, for example, the first notification unit 33 might indicate an operating state of the front suspension FS and the second notification unit 34 might indicate an operating state of the rear suspension RS.

In this embodiment, the left switch LSW and the left switch RSW can operate be operated with three operating methods: a short push operation, a "first long push operation, and a second long push operation. The short push operation is an example of a first manual operation, the second long push operation is an example of a second manual operation, and the first long push operation is an example of a third operation. The short push operation is a single operation having an operation time shorter than a first determination time T1. The first long push operation is a single operation having an operation time equal to or longer than the first determination time T1 and shorter than a second determination time T2. The second long push operation is a single operation having an operation time equal to or longer than the second determination time T2. An operating state of a suspension or a combination of operating states of suspensions are assigned to the short push operation, the first long push operation, and the second long push operation of each of the left switch LSW and the right switch RSW.

The front gear shifting unit 20a has a front upshift switch 21a and a front downshift switch 21b. The rear gear shifting unit 20b has a rear upshift switch 21c and a rear downshift switch 21d.

A cycling computer 40 is detachably mounted on the handlebar 15. The cycling computer 40 is indicates typical cycling computer content, such as a traveling speed of the bicycle. The cycling computer 40 is also configured to indicate operating states of the transmission devices, the front suspension FS, and the rear suspension RS, i.e., a combination of the operating states. In this embodiment, the cycling computer 40 indicates if an operating mode is set to a first long push mode or a second long push mode. The cycling computer 40 is provided with a speaker 88 for reporting operating states and a plurality of operating buttons 89.

Figure 4:
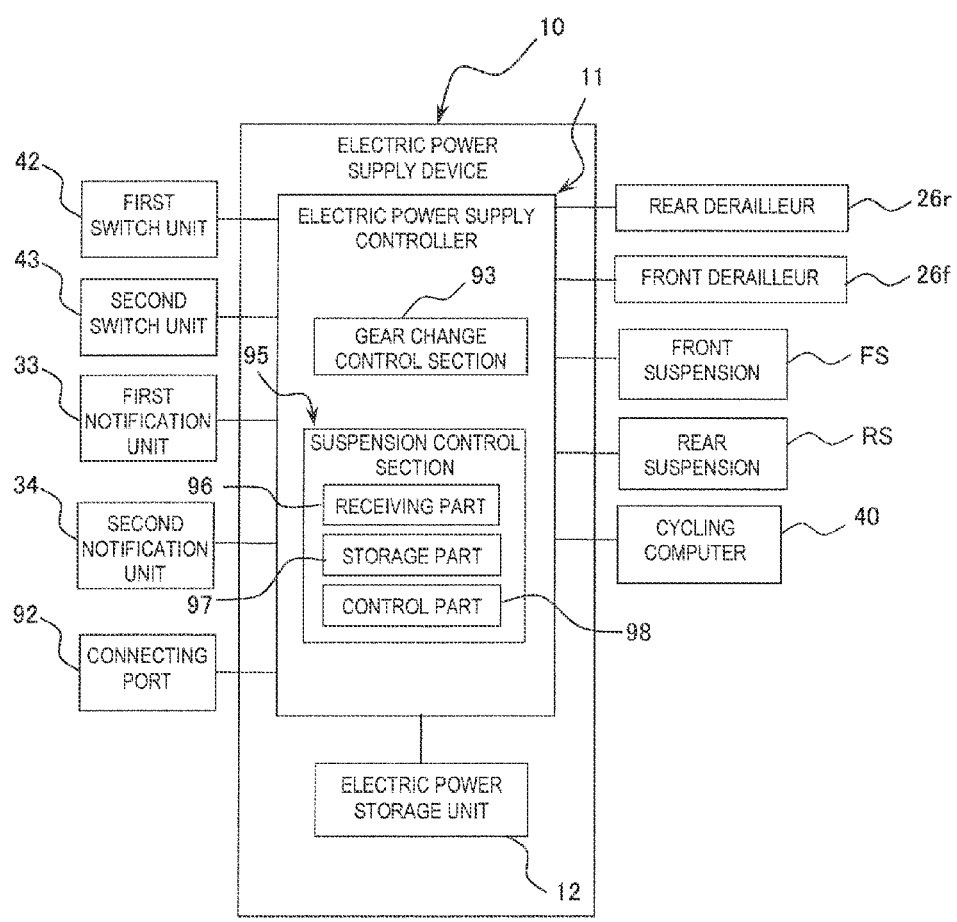
FIG. 4 is a block diagram showing an electric component connection structure of an electric power supply device.

As shown in FIG. 4, the electric power supply device 10 has an electric power supply controller 11 and an electric power storage unit 12 serving as an electric power source. The electric power supply controller 11 is an example of a control device configured to control a suspension. The electric power storage unit 12 can be attached and detached to and from the electric power supply controller 11. The electric power supply controller 11 controls the electric power storage unit 12. The power supply control device 11 also serves as a general controller of the front electric powered transmission device 8, the rear electric power transmission device 9, the front suspension FS, the rear suspension RS, the first switch unit 42, and the second switch unit 43.

The first switching unit 42 includes the left switch LSW, the front upshift switch 21a, the front downshift switch 21b, and the first notification unit 33. The second switching unit 43 includes the right switch RSW, the rear upshift switch 21c, the rear downshift switch 21d, and the second notification unit 34.

A connecting port 92 is provided on the electric power supply device 10. The connecting port 92 is a USB (Universal Serial Bus) port that can connect with, for example, a B connector.

Figure 5:
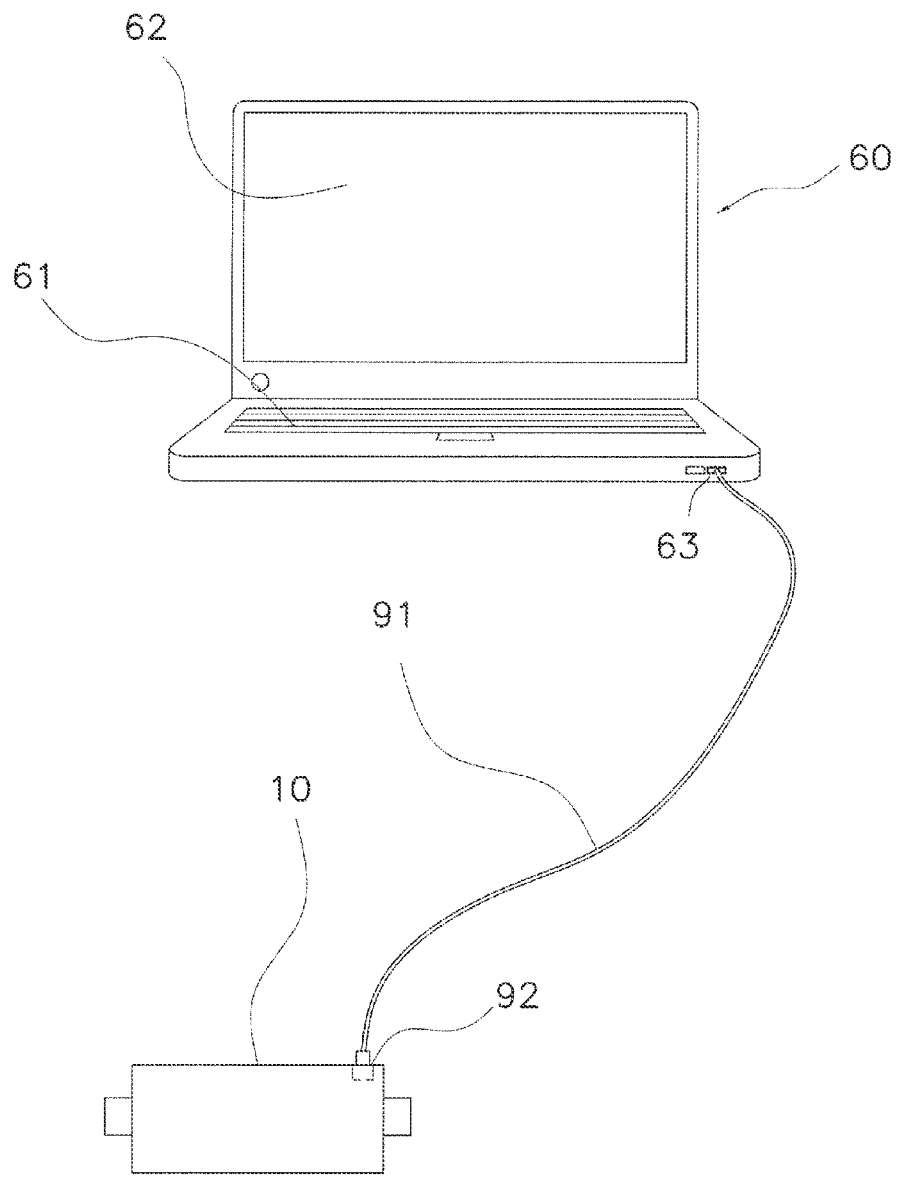
FIG. 5 is a block diagram showing how an external device is connected.

As shown in FIG. 5, the electric power supply device 10 can be connected to an external device 60 through a connecting cable 91. The connecting cable 91 comprises, for example, a USB cable having an A connector at one end and a B connector at the other end.

The external device 60 is, for example, a notebook-type computer. The external device 60 is used to set an operating method of at least one of the left switch LSW and the right switch RSW.

Figure 6:
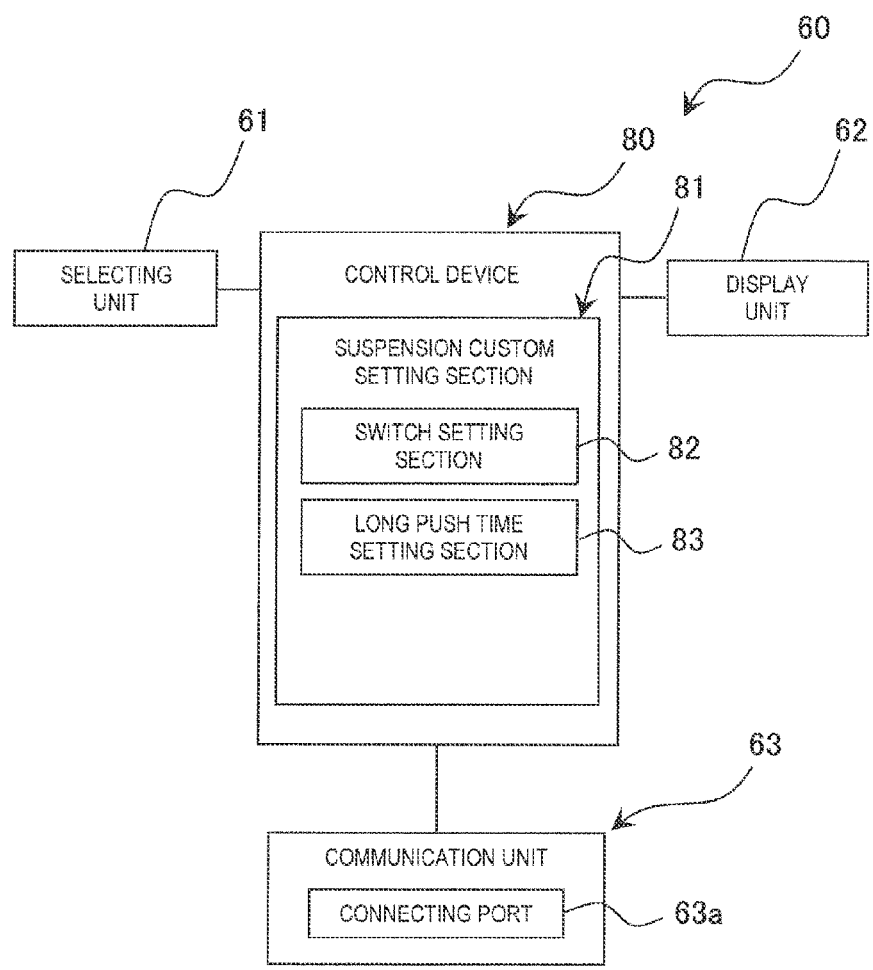
FIG. 6 is a block diagram showing functional features of a control device of the external device of the first embodiment.

As shown in FIG. 6, the external device 60 has a selecting unit 61, a display unit 62, and a communication unit 63 equipped with a connecting port 63a. The selecting unit 61 includes a keyboard and a mouse, touch pad, or other pointing device. The selecting device 61 serves to select setting information to be displayed on the display unit 62. The display unit 62 displays setting information that can be set with respect to the left switch LSW and the right switch RSW. The connecting port 63a is, for example, a USB port. The connecting port 63a is an example of a wired connection section. The connecting port 63a can be connected electrically through the connecting cable 91 to an electric power supply section 11 installed on the bicycle. In this way, setting information selected using the selecting unit 61 can be transmitted to, for example, the electric power supply controller 11.

Figure 7:
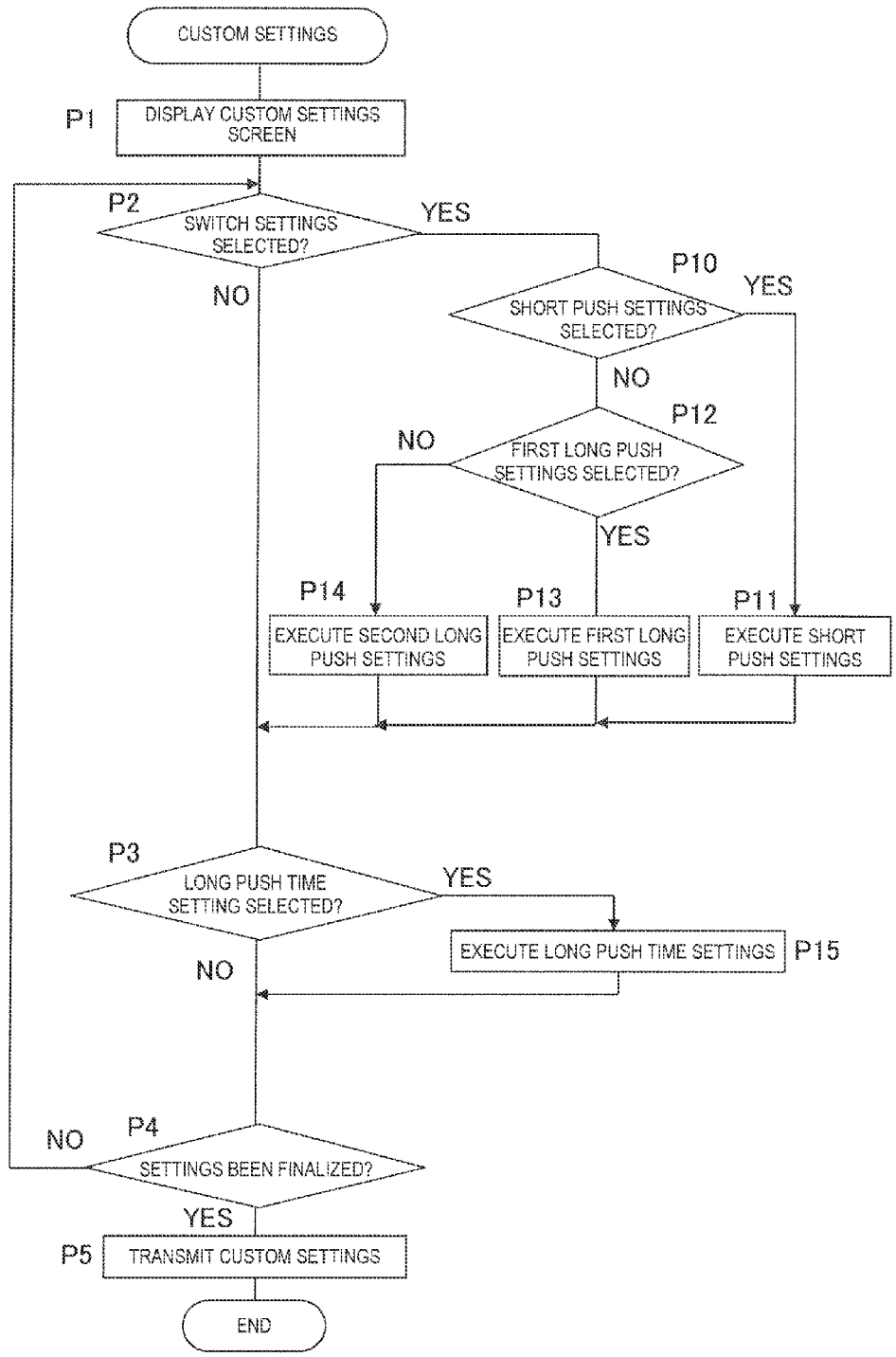
FIG. 7 is a flowchart showing operations executed by the control device to accomplish custom settings of the first embodiment.

As shown in FIG. 7, the external device 60 is equipped with a control device 80 that includes a microcomputer. The control device 80 has a suspension custom settings section 81 that is a functional component realized with software. The custom settings section 81 has a switch setting section 82 and a long push time setting section 83. The custom settings section 81 serves to allow the front suspension FS and the rear suspension RS to be set in accordance with a user's preference.

The switch setting section 82 serves to assign operating states or combinations of operating states of the front suspension FS and the rear suspension RS to the operating methods of the left switch LSW and the right switch RSW. In this embodiment, the left switch LSW and the right switch RSW each have three operating methods.

The operating states of the front suspension FS and the rear suspension RS can be set (changed) using either an independent mode or a coordinated mode. In the independent mode, the operating states of the front suspension FS and the rear suspension RS are set independently with the left switch LSW and the right switch RSW. In the coordinated mode, combinations of operating states of the front suspension FS and the rear suspension RS are set independently with the left switch LSW and the right switch RSW.

The operating states of the front suspension FS include a first operating state in which the front suspension FS cannot expand and contract, a second operating state in which the front suspension FS can expand and contract with a first stiffness (first damping setting), and a third operating state in which the front suspension FS can expand and contract with a second stiffness (second damping setting). The operating states of the rear suspension RS include a fourth operating state in which the suspension cannot expand and contract, a fifth operating state in which the suspension can expand and contract with a first stiffness (first damping setting), and a sixth operating state in which the suspension can expand and contract with a second stiffness (second damping setting). The first and fourth operating states are locked states. The second, third, fifth and sixth operating states are free states. The front suspension FS is stiffer in the second operating state than in the third operating state. The rear suspension RS is stiffer in the fifth operating state than in the sixth operating state. Hereinafter, the second and fifth operating states are called "hard" states with a first stiffness (first damping setting) and the third and sixth operating states are called "soft" states with a second stiffness (second damping setting). Thus, the first and second damping settings are different to provide a rider with either a stiffer or softer ride. When the independent mode is selected, the short push operation, the first long push operation, and the second long push operation of the left switch LSW and the right switch RSW serve to select the respective three operating states of the front suspension FS and the rear suspension RS independently.

The coordinated mode includes the following nine operating state combinations (I to IX).

I. The front suspension FS is set to the locked state and the rear suspension RS is set to the locked state. Hereinafter, this combination is called "fully rigid."

II. The front suspension FS is set to the hard state and the rear suspension RS is set to the hard state. Hereinafter, this state is called "first full suspension".

III. The front suspension FS is set to the hard state and the rear suspension RS is set to the soft state. Hereinafter, this combination is called "second full suspension."

IV. The front suspension FS is set to the soft state and the rear suspension RS is set to the hard state. Hereinafter, this combination is called "third full suspension."

V. The front suspension FS is set to the soft state and the rear suspension RS is set to the soft state. Hereinafter, this combination is called "fourth full suspension."

VI. The front suspension FS is set to the hard state and the rear suspension RS is set to the locked state. Hereinafter, this combination is called "first hard tail."

VII. The front suspension FS is set to the soft state and the rear suspension RS is set to the locked state. Hereinafter, this combination is called "second hard tail."

VIII. The front suspension FS is set to the locked state and the rear suspension RS is set to the hard state. Hereinafter, this combination is called "first hard front."

IX. The front suspension FS is set to the locked state and the rear suspension RS is set to the soft state. Hereinafter, this combination is called "second hard front."

When the coordinated mode is selected, the short push operation, the first long push operation, and the second long push operation of the left switch LSW and the right switch RSW serve to select from among a plurality of the nine combinations of operating states of the front suspension FS and the rear suspension RS independently.

In this embodiment, the combination of operating states that is currently set is indicated on the cycling computer 40. A locked state of the front suspension FS and the rear suspension RS are indicated on the first notification unit 33 and the second notification unit 34 regardless of whether the independent mode or the coordinated mode is selected. For example, it is acceptable for the first notification unit 33 to illuminate in red when the front suspension FS is in a locked state. Meanwhile, it is acceptable for the first notification unit 33 to go out (not illuminate) or illuminate in a different color when the front suspension FS is in the hard state. Also, for example, it is acceptable for first notification unit 33 to go out when the front suspension FS is in the soft state. Similarly, it is acceptable for the second notification unit 34 to illuminate in red when the rear suspension RS is in a locked state. Similarly, it is acceptable for the second notification unit 34 to illuminate in green when the rear suspension RS is in a hard state. Also, for example, it is acceptable for second notification unit 34 to go out when the rear suspension RS is in the soft state. The operating state can also be indicated by the illuminated state of an LED, the number of LEDs that are illuminated, or the position of an illuminated LED. Illuminated states of an LED that can be employed to indicate an operating state include the color, a flashing state, a length of a flashing interval, and a number of times flashing occurs.

The long push time setting section 83 is provided for setting a first determination time T1 and a second determination time T2 used to determine if a first long push operation or a second tong push operation has been executed. The first determination time T1 and the second determination time T2 are each set to one of a plurality of predetermined amounts of time. The first determination time T1 cannot be set to an amount of time smaller than the second determination time T2.

The processing steps executed by the control device 80 of the external device 60 in order to accomplish custom settings of the suspensions will now be explained based on the flowchart shown in FIG. 7. In order to execute custom settings, a user connects the external device 60 to the electric power supply device 10 with connecting cable 91.

Figure 8:
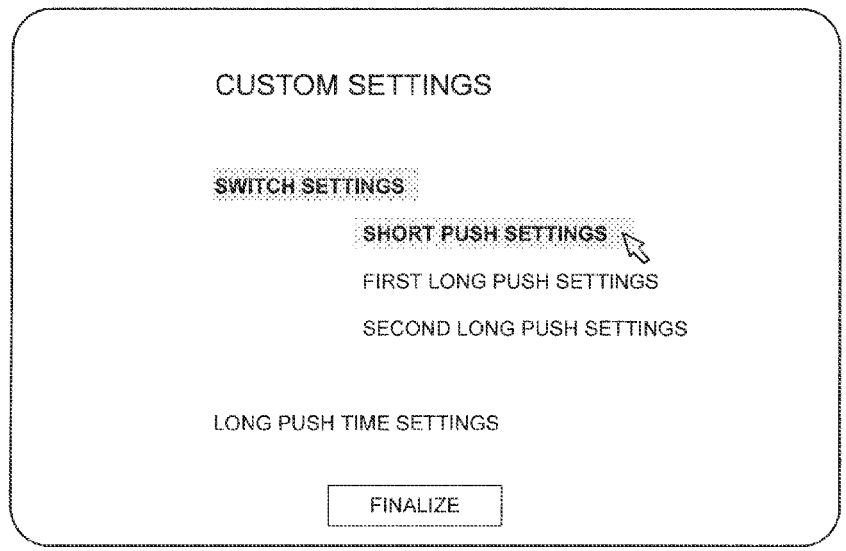
FIG. 8 is a schematic view of a custom settings screen for the switches in the first embodiment.

In a step P1 of FIG. 7, the custom settings screen is displayed as shown in FIG. 8. The custom settings screen shows the items for which custom settings can be made with respect to the suspensions. In this embodiment, there are two setting categories: "Switch Settings" and "Long push Time Settings," A user uses the selecting unit 61 to select one of the categories. A category to be set is selected by, for example, aligning a pointer with the category and clicking. Switch Settings further includes the categories "Short Push Settings," "First Long Push Settings," and "Second Long Push Settings." Switch Settings further includes the categories "Short Push Settings," "First Long Push Settings," and "Second Long Push Settings." For example, if the user uses a mouse to select the category, then the user aligns a pointer with the desired category and clicks the mouse. Or, if the user uses a keyboard to select the category, then the user moves a cursor using the keyboard and operates a select key to select the category. If the user uses a touch panel to select the category, then the user touches a portion of the touch panel where the category is displayed to select the category. The explanation that follows assumes a mouse is used to selected setting categories. When a category is selected, the selected state is indicated by, for example, a change of a background color or a change of the color of the letters. As a result, the user can recognize which category has been selected.

Switch Settings further includes the categories "Short Push Settings," "First Long Push Settings," and "Second Long Push Settings." Under Short Push Settings, a user sets a suspension operating state to be assigned to the short push operation. Under First Long Push Settings, a user sets a suspension operating state to be assigned to the first long push operation. Under Second Long Push Settings, a user sets a suspension operating state to be assigned to the second long push operation. If suspension operating states are assigned to only two of the three operating methods, then the operating state of the suspension can only be changed using the two operating methods to which an operating state has been assigned.

In step P2, the control device 80 determines if Switch Settings has been selected. In step P3, the control device 80 determines if Long push Time Setting has been selected. In step P4, the control device 80 determines if a setting has been finalized. When the user has finished adjusting settings, the user aligns the pointer and clicks a finalize button provided, for example, on a bottom portion of the custom settings screen. When it determines that the settings have been finalized, the control device 80 proceeds from step P4 to step P5. In step P5, the control device 80 transmits information indicating the settings made through the custom settings to the electric power supply controller 11 through the connecting cable 91 and ends the control sequence.

If Switch Settings is selected, then the control device 80 proceeds from step P2 to step P10. In step P10, the control device 80 determines if Short Push Settings has been selected. If Short Push Settings has been selected, then the control device 80 proceeds to step P11. In step P11, the control device 80 executes short push settings and, when finished, proceeds to step P3.

Figure 9:
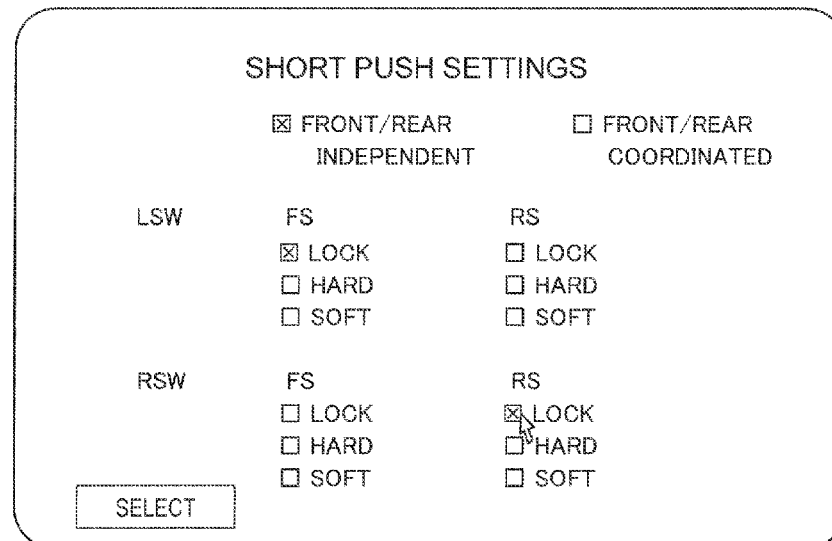
FIG. 9 is a schematic view of a setting screen for standard settings of the switches when an independent mode has been selected in the first embodiment.

The short push settings screen is shown in FIGS. 9 and 10. FIG. 9 shows the Short Push Settings screen when the independent mode is selected. More specifically, in FIG. 9, an operating state of the front suspension FS or an operating state of the rear suspension RS is assigned to each of the left switch LSW and the right switch RSW.

In order to set the independent mode, a user aligns the pointer with a checkbox adjacent to "Front/rear independent" and clicks the mouse to insert a check mark. This sets the front suspension FS and the rear suspension RS to independent mode. In order to cancel independent mode, a user aligns the pointer with the check mark and clicks the mouse. Next, one of the three operating states "Locked," "Hard," or "Soft" is selected to be assigned to each switch. A user selects the operating state to be assigned by aligning the pointer with a checkbox adjacent to the operating state and clicking the mouse to insert a check mark. FIG. 9, for example, illustrates a case in which the locked state of the front suspension FS is assigned to the left switch LSW and the locked state of the rear suspension RS is assigned to the right switch RSW.

In order to set the coordinated mode, a user inserts a check mark into a checkbox adjacent to "Front/rear coordinated." The user then inserts a check mark adjacent to an operating state of each of the front suspension FS and the rear suspension RS. FIG. 10, for example, illustrates a case in which the fully rigid state is assigned to the left switch LSW and the fourth full suspension is assigned to the right switch RSW. When the task of assigning switches is finished, the user aligns the pointer and clicks a Selection button. The settings are stored in the external device 60 and the display returns to the custom settings screen.

If the left switch LSW or the right switch RSW will not be used, then it is acceptable not to assign an operating state to the switch that will not be used. Here, too, if the Select button is selected, then the settings are completed and the display returns to the custom settings screen.

If it determines that Short Push Settings is not selected in step P10 of FIG. 7, then the control device 80 proceeds to step P12. In step P12, the control device 80 determines if First Long Push Settings has been selected. If First Long Push Settings is selected, then the control device 80 proceeds to step P13 for setting operation states to be assigned to the first long push operations of the switches.

The first long push settings screen is shown in FIGS. 11 and 12. FIG. 11 shows the first long push settings screen when the independent mode is selected. FIG. 12 shows the first long push settings screen when the coordinated mode is selected.

The first long push setting screen is basically the same as the short push settings screen. In the independent mode shown in FIG. 11 an individual operating state of the front suspension FS or the rear suspension RS is assigned to each of the left switch LSW and the right switch RSW in the same manner as for the short push settings, and in the coordinated mode shown in FIG. 12 a combination of operating states of the front suspension FS and the rear suspension RS is assigned to each of the left switch LSW and the right switch RSW. In FIG. 11, for example, the independent mode of the first long push operation of the switches is set such that the hard state of the front suspension FS is assigned to the left switch LSW and the hard state of the rear suspension RS is assigned to the right switch RSW. Meanwhile, in FIG. 12, for example, the coordinated mode of the first long push operation of the switches is set such that the first full suspension combination is assigned to the left switch LSW and the second full suspension combination is assigned to the right switch RSW.

Figures 14, 15:
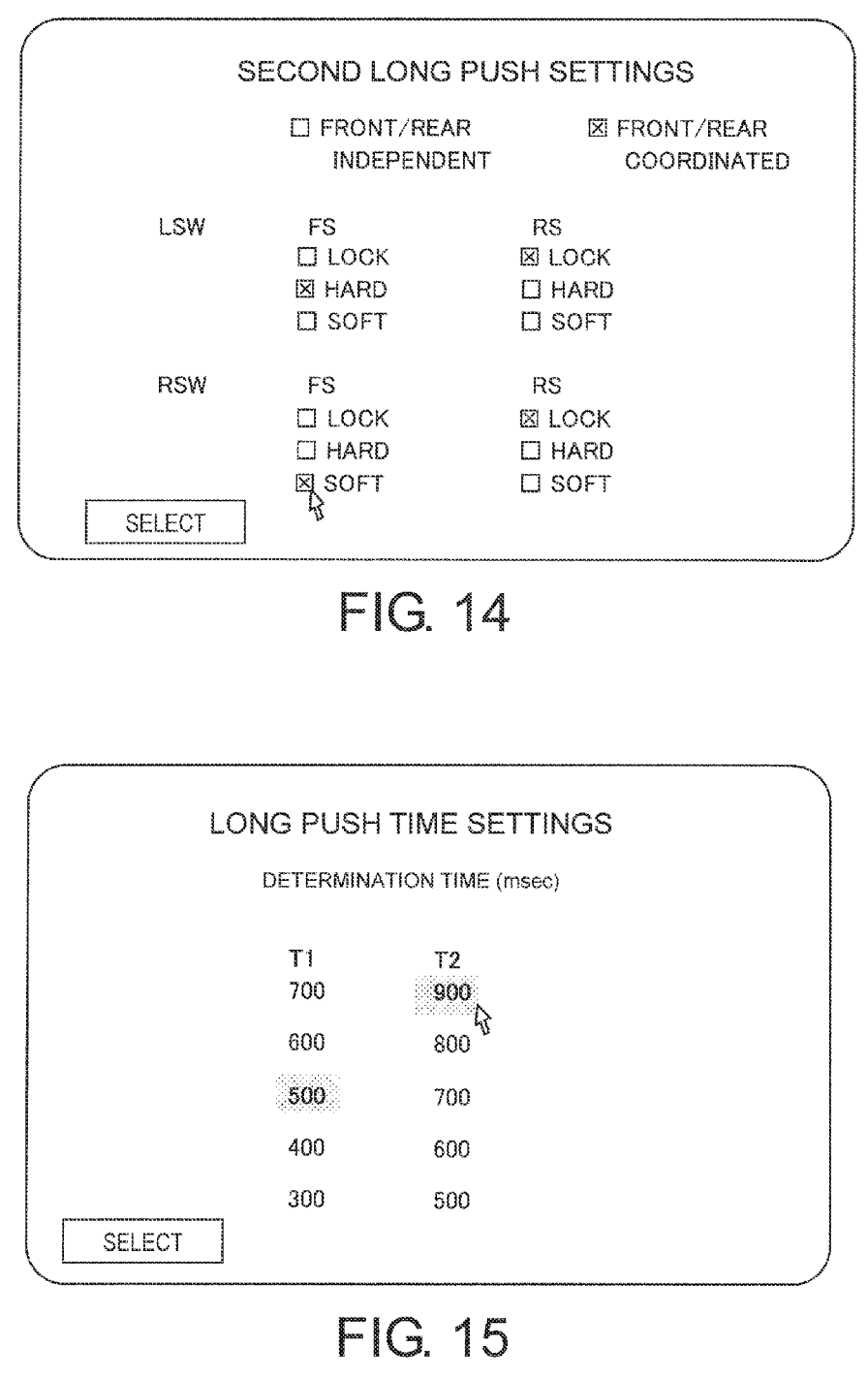

If it determines that First Long Push Settings is not selected in step P11 of FIG. 7, then the control device 80 proceeds to step P14. In step P14, the second long push settings are executed. The second long push settings screen is shown in FIGS. 13 and 14. FIG. 13 shows the second long push settings screen when the independent mode is selected. FIG. 14 shows the second long push settings screen when the coordinated mode is selected.

The second long push setting screen is basically the same as the short push settings screen. In the independent mode shown in FIG. 13 an individual operating state of the front suspension FS or the rear suspension RS is assigned to each of the left switch LSW and the right switch RSW in the same manner as for the short push settings, and in the coordinated mode shown in FIG. 14 a combination of operating states of the front suspension FS and the rear suspension RS is assigned to each of the left switch LSW and the right switch RSW. FIG. 13, for example, shows a case in which the independent mode of the second long push operation of the switches is set such that the soft state of the front suspension FS is assigned to the left switch LSW and the soft state of the rear suspension RS is assigned to the right switch RSW. Meanwhile, FIG. 14 shows a case in which the coordinated mode is set such that the first hard tail combination is assigned to the left switch LSW and the second hard tail combination is assigned to the right switch RSW.

If the control device 80 determines that Long Push Time Setting is selected in step P3 of FIG. 8, then the control device 80 proceeds from step P3 to step P15. In step P15, the control device 80 displays the long push time setting screen shown in FIG. 15 on the display unit 62. When the long push time setting is finished, the control device 80 proceeds to step P4. The long push time setting screen enables a minimum value of the first determination time T1 for the first long push operation and a minimum value of the second determination time T2 for the second long push operation to be set with respect to the switches. In this embodiment, as shown in FIG. 15, the first determination time can be set to one of five values ranging from 300 ms to 700 ms and separated by intervals of 100 ms. Also, in this embodiment, the second determination time can be set to one of five values ranging from 500 ms to 900 ms and separated by intervals of 100 ms. In FIG. 15, 500 ms is selected as the first determination time and 900 ms is set as the second determination time. Thus, the control device 80 determines that a second long push operation has been executed when a switch is operated continuously for 900 ms or longer and that a first long push operation has been executed when a switch is operated for 500 ms or longer but shorter than 900 ms.

The electric power supply controller 11 is an example of an electric component control unit 92. The electric power supply controller 11 has, for example, a microcomputer and the functional components of the electric power supply controller 11 are realized chiefly through software, as shown in FIG. 4. The electric power supply controller 11 has a gear change control section 93 and a suspension control section 95, and the suspension control section 95 is an example of a suspension control device. The first switch unit 42 and the second switch unit 43 are connected to the electric power supply controller 11. The rear derailleur 26r, the front derailleur 26f, the front suspension FS, the rear suspension RS, and the cycling computer 40 are also connected to the electric power supply control device 11. The electric power storage unit 12 is also detachably connected to the electric power supply controller 11.

The suspension control section 95 has a receiving means 96, a storage means 97, and a control means 98 as functional components. The receiving means 96 can receive information expressing an operating state of the front suspension, information expressing an operating state of the rear suspension RS, and combination information expressing at least one combination among the combinations of operating states of the front suspension FS and the rear suspension RS. The receiving means 96 is realized by, for example, including a connecting port 92 and can be connected to the external device 60 through the connecting port 92. The storage means 97 stores information indicating an operating state and/or combination of operating states received by the receiving means 96. The storage means 97 includes a non-volatile memory inside the suspension control section 95. The control means 98 is configured to control the front suspension FS and the rear suspension RS based on operating state information and/or operating state combination information stored in the storage means 97 when the left switch LSW and the right switch RSW are operated.

Control operations executed by the suspension control section 95 will now be explained based on the flowcharts shown in FIGS. 16 and 17.

Figure 16:
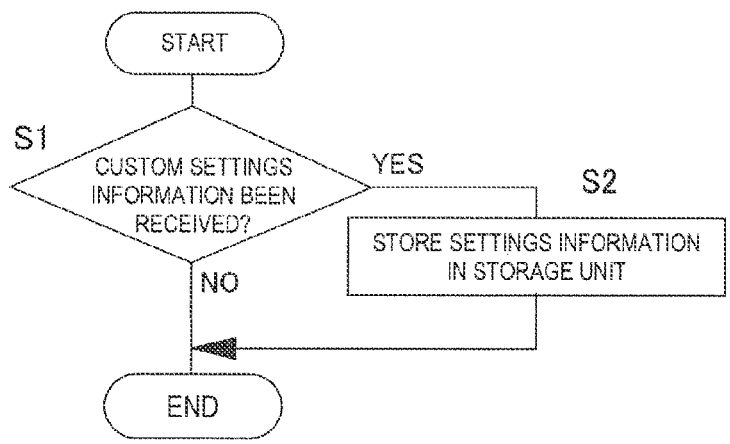
FIG. 16 is a flowchart showing control operations executed by the electric power supply controller when settings are received.

FIG. 16 is a flowchart showing control operations executed by the suspension control section 95 during custom settings. When the electric power line is connected to the setting device 60, the suspension control section 95 starts the custom settings processing and proceeds to step S1. In step S1, the suspension control section 95 determines if setting information has been received from the external device 60. If setting information has been received, the suspension control section 95 proceeds from step S1 to step S2. In step S2, the suspension control section 95 stores the received setting information in the storage means 97 and ends the control sequence.

Figure 17:
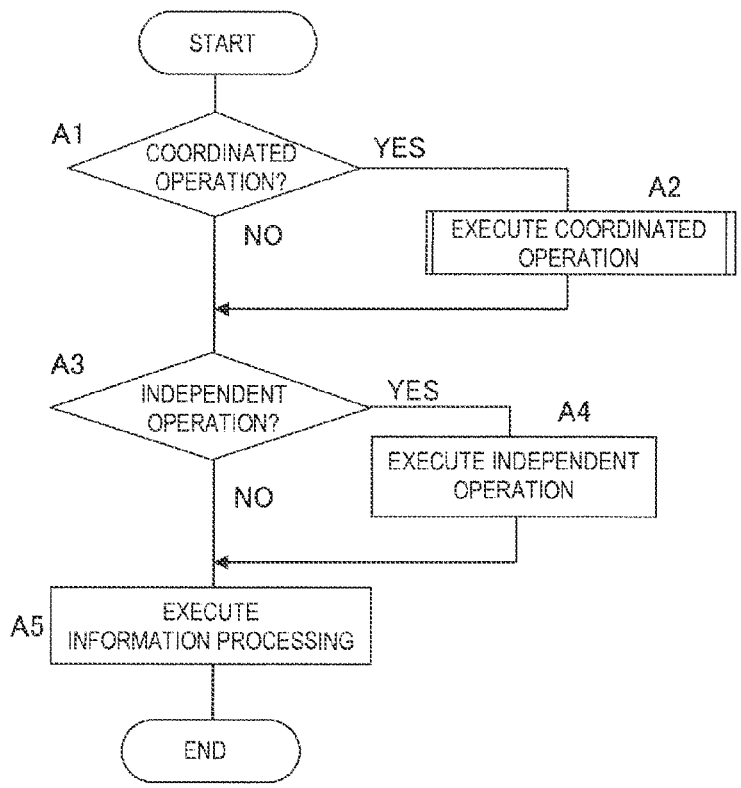
FIG. 17 is a flowchart showing normal control operations executed by the electric power supply controller.

FIG. 17 is a flowchart showing control operations executed by the suspension control section 95 during normal circumstances. After electric power is supplied to the suspension control section 95, the suspension control section 95 starts and proceeds to step A1 when a switch of one of the operating devices is operated. When the power supply is turned on, the suspension control section 95 sets the front suspension FS and the rear suspension RS to a predetermined default setting state. The default setting state is, for example, an operating state in which the front suspension FS and the rear suspension RS are both in the soft state. It is also acceptable for the default setting state to be set in advance by the setting device 60.

In step A1, the suspension control section 95 determines if the operated switch is a switch assigned to execute a coordinated operation. The suspension control section 95 then proceeds to step A2 if it determines in step A1 that the switch is assigned to execute a coordinated operation or proceeds to step A3 if it determines that the switch is not assigned to execute a coordinated operation. In step A3, the suspension control section 95 determines if the operated switch is a switch assigned to execute an independent operation. The suspension control section 95 then proceeds to step A4 if it determines in step A3 that the switch is assigned to execute an independent operation or proceeds to step A5 if it determines that the switch is not assigned to execute an independent operation.

In step A5, the suspension control section 95 issues a notification to at least one of the first notification unit 33, the second notification unit 34, and the cycling computer 40 based on the operating state assigned to the switch. The suspension control section 95 then proceeds to step A6 and ends the control sequence.

The coordinated operation control executed in step A2 of FIG. 17 serves to change a combination of operating states of the front suspension FS and the rear suspension RS in response to an operation of the left switch LSW or the right switch RSW. The independent operation control executed in step A4 of FIG. 17 serves to change an operating state of the front suspension FS or the rear suspension RS individually in response to an operation of the left switch LSW or the right switch RSW.

Figure 18:
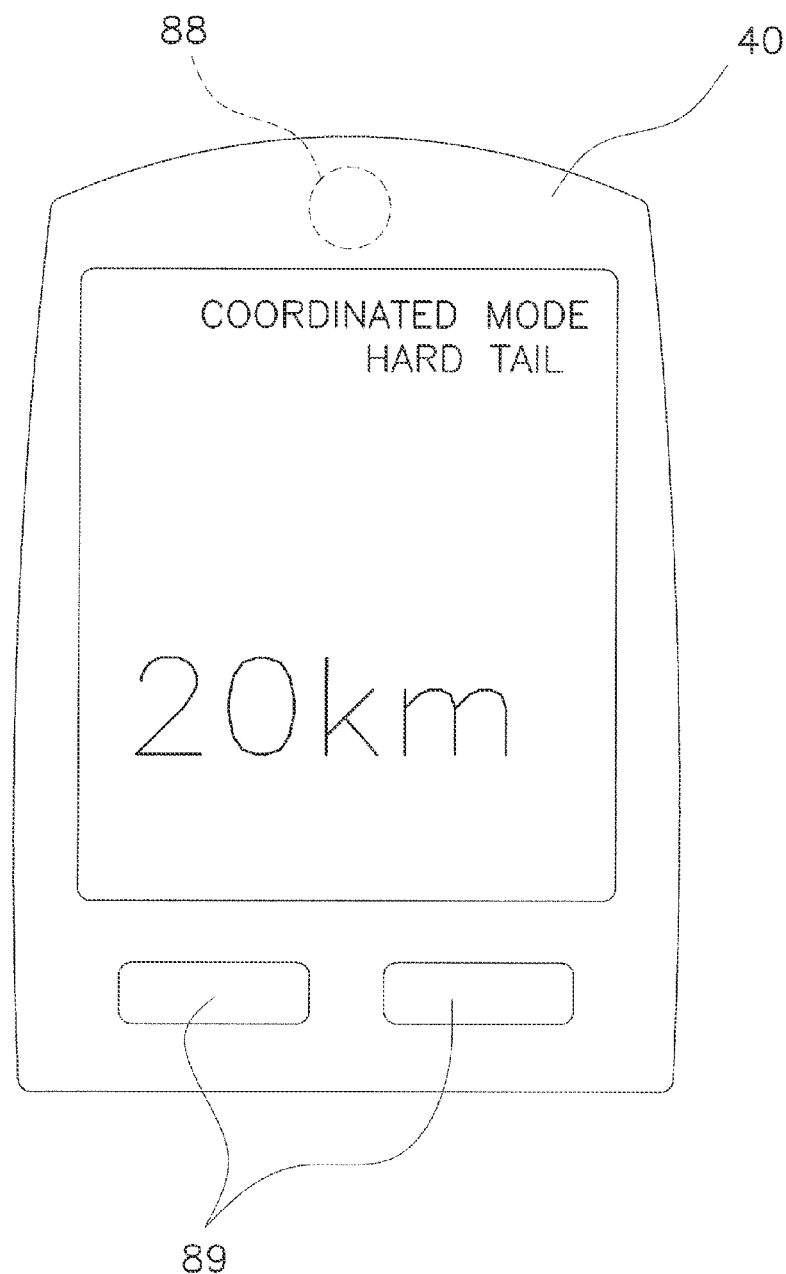
FIG. 18 is a schematic view of a screen shot showing an example of content displayed on a cycling computer display screen.
Figure 20:
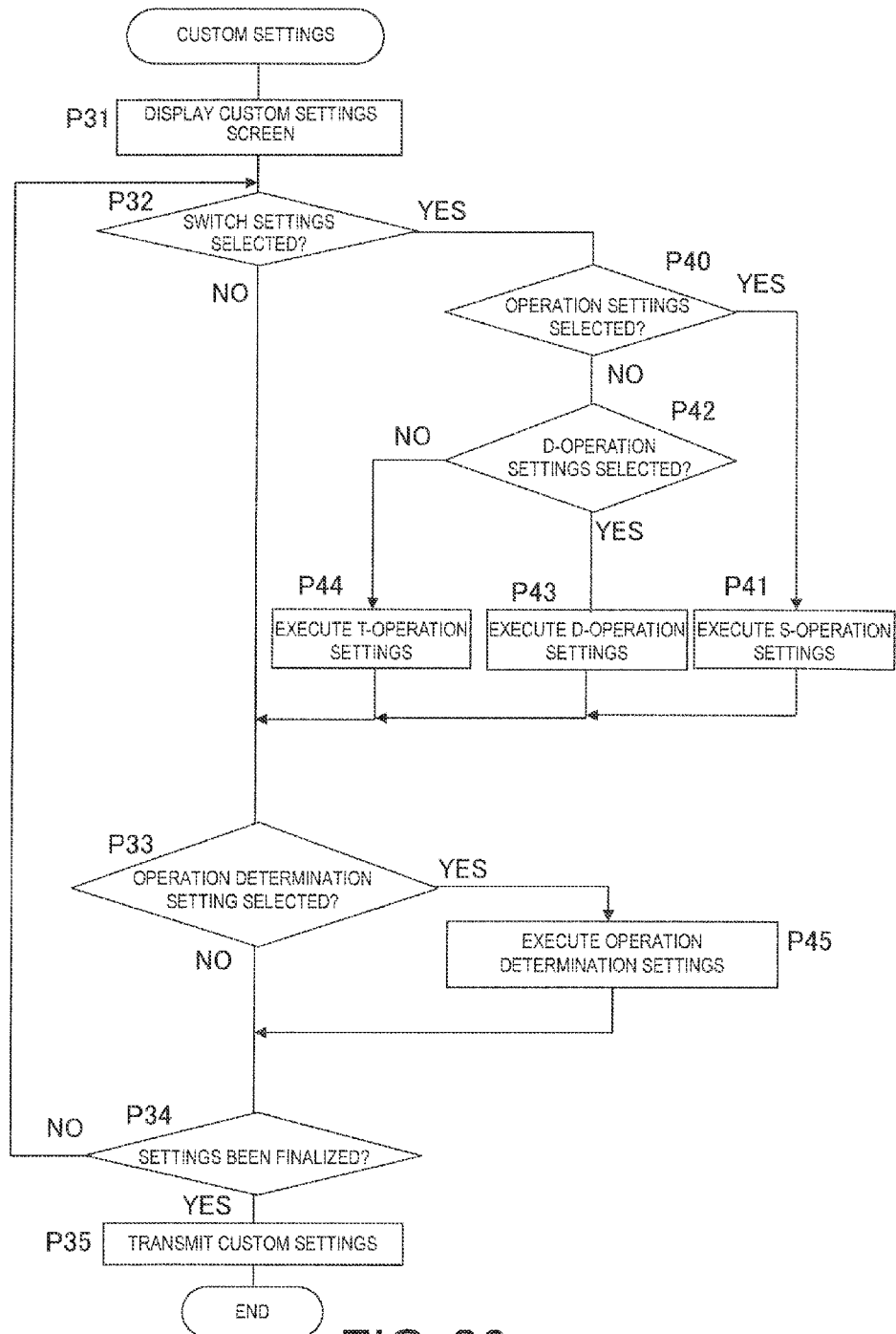
FIG. 20 is a flowchart showing operations executed by the control device to accomplish the custom settings in the second embodiment.

It is acceptable to contrive the notification processing of step A5 of FIG. 20 to indicate a current operating state on the cycling computer 40 based on a setting state read from the storage means 97. Furthermore, it is acceptable to indicate which of the nine operating state combinations is selected as shown in FIG. 18 during the coordinated mode.

Although in this embodiment various operating states of the suspensions can be set can be set in response to the various switches, it is also acceptable to, for example, contrive the setting control such that a suspension is set to be stiffer when the operation time is longer or such that a suspension is set to be stiffer when the operation time is shorter. In such a case, it is possible that the relationship between the operating time of a switch and a stiffness change of a suspension will be easier for a user to understand. One example is to set the operating device such that a long push operation changes only the front suspension FS to a locked state and such that a short push operation releases the locked state of only the front suspension FS. Another example is to set the operating device such that both the front suspension FS and the rear suspension RS are changed to the locked state in response to a second long push operation, both the front suspense ion FS and the rear suspension RS are changed to the hard state in response to a first long push operation, and both the front suspension FS and the rear suspension RS are changed to the soft state in response to a short push operation.

While in the first embodiment a first manual operation, a second manual operation, and a third operation of the left switch LSW and the right switch RSW are defined in terms of an operation time (duration of operation) of a single switch operation, in the second embodiment a first manual operation, a second manual operation, and a third operation of the left switch LSW and the right switch RSW are defined in terms of an operation count (number of times operated) a single switch is operated within a prescribed amount of time. More specifically, the first manual operation is a single operation (hereinafter called "S-operation"), the second manual operation is a double operation (hereinafter called "D-operation"), and the third operation is a triple operation (hereinafter called "T-operation"). The S-operation is executed by operating a switch once within a determination time T3 explained later. The S-operation is one example of a first manual operation. The D-operation is executed by operating a switch twice within a prescribed determination time T explained later. The D-operation is one example of a second manual operation. The T-operation is executed by operating a switch three times within a determination time T explained later. The 1-operation is one example of a third operation. For example, if the switch is a single contact single-contact switch, then a number of times the switch is operated (operation count) corresponds to a number of times the contact of the switch is connected or disconnected.

Figure 19:
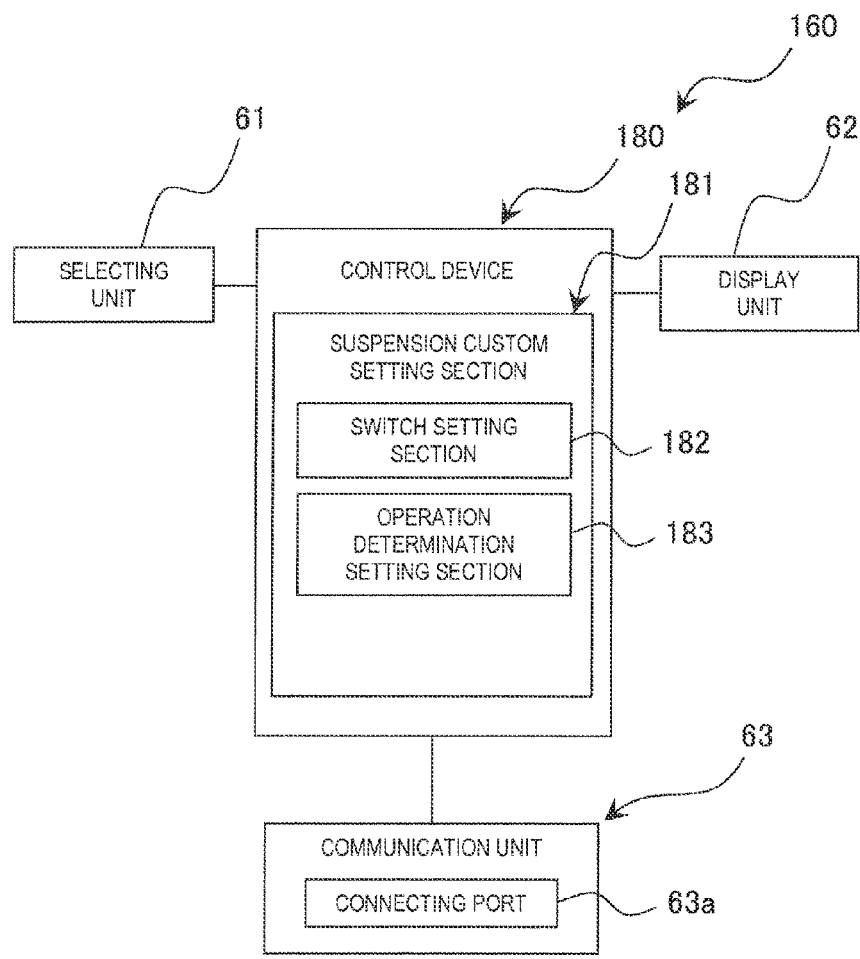
FIG. 19 is a block diagram showing functional features of a control device of the external device according to a second embodiment.

As shown in FIG. 19, the functional components of the external device 160 in the second embodiment are different from the first embodiment. The control device 180 of the external device 160 has a suspension custom settings section 181 that is a functional component realized with software. The custom settings section 181 has a switch setting section 182 and a T-operation/D-operation determination setting section 183.

The T-operation/D-operation determination setting section 183 is provided to set a determination time used to determine if a T-operation or a D-operation has been executed. The T-operation/D-operation determination setting section 183 is used during T-operation Settings and D-operation Settings and sets the determination time to any one of a plurality of time amounts. In this embodiment, the determination time T is set to one of a plurality of predetermined amounts of time.

The processing steps executed in the second embodiment by the control device 180 of the external device 160 in order to accomplish custom settings of the suspensions will now be explained based on the flowchart shown in FIG. 20. In order to execute custom settings, a user connects the external device 60 to the electric power supply device 10 with connecting cable 91.

Figure 21:
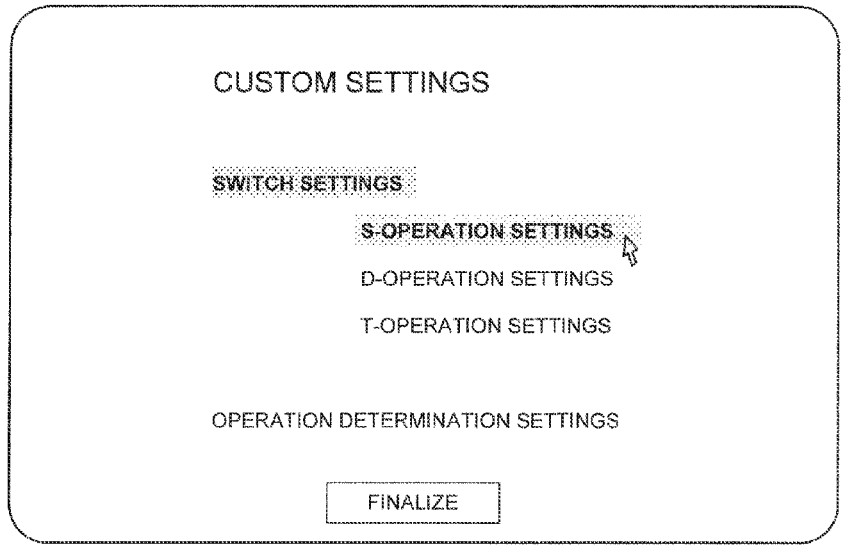
FIG. 21 is a schematic showing a custom settings screen for the switches in the second embodiment.

In a step P3 of FIG. 20, the custom settings screen is displayed as shown in FIG. 21. The custom settings screen shows the items for which custom settings can be made with respect to the suspensions. In this embodiment, there are two setting categories: "Switch Settings" and "T-operation/D-operation Determination Setting." Similarly to the previously explained embodiment, a user uses the selecting unit 61 to select a category. Switch Settings includes the subcategories "S-operation Settings," "D-operation Settings," and "T-operation Settings." It is also acceptable to contrive the apparatus such that "S-operation Settings," "D-operation Settings," and "T-operation Settings" appear when "Switch Settings" is selected. In this embodiment, the explanation assumes a mouse is used to select items displayed on the screen. A category to be set is selected by, for example, aligning a pointer with the category and clicking. Under Switch Settings, at least two subcategories among the S-operation Settings, the D-operation Settings, and the T-operation Settings are set. When a category is selected, the selected state is indicated by, for example, a change of a background color or a change of the color of the letters. As a result, the user can recognize which category has been selected. When only two operating methods among the aforementioned three operating methods are set, the operating device can be operated using the two set operating methods.

In step P32, the control device 180 determines if Switch Settings has been selected. In step P33, the control device 180 determines if Operation Determination Setting has been selected. In step P34, the control device 180 determines if a setting has been finalized. When the user has finished adjusting settings, the user aligns the cursor and clicks a finalize button provided, for example, on a bottom portion of the custom settings screen. When it determines that the settings have been finalized, the control device 180 proceeds from step P34 to step P5. In step P35, the control device 180 transmits information indicating the settings made through the custom settings to the electric power supply controller 11 through the connecting cable 91 and ends the control sequence.

If Switch Settings is selected, then the control device 180 proceeds from step P32 to step P40. In step P40, the control device 180 determines if S-operation settings has been selected. If S-operation settings have been selected, then the control device 180 proceeds to step P41. In step P41, the control device 180 executes S-operation settings and, when finished, proceeds to step P33.

Figure 22:
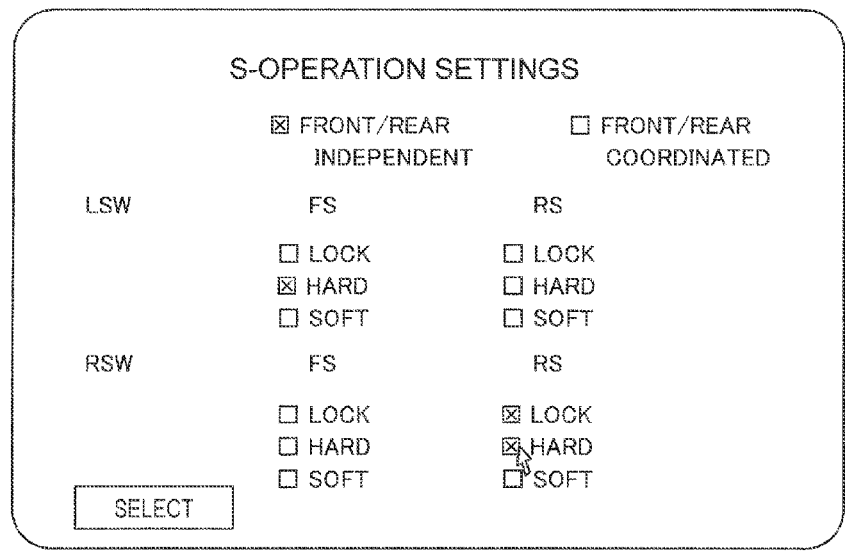
FIG. 22 is a schematic showing an S operation setting screen for the switches in the second embodiment and indicates that an independent mode is selected.

Setting screens for the S-operation settings are shown in FIGS. 22 and 23. FIG. 22 shows an S-operation settings screen indicating a state in which the independent mode is selected. FIG. 23 shows an S-operation settings screen indicating a state in which the coordinated mode is selected.

More specifically, in FIG. 22, an individual operating state of the front suspension FS or the rear suspension RS is assigned to each of the left switch LSW and the right switch RSW. In order to set the independent mode, a user aligns the pointer with a check box adjacent to "Front/rear independent" and clicks the mouse to insert a check mark. This sets the front suspension FS and the rear suspension RS to independent mode. In order to cancel independent mode, a user aligns the pointer with the check mark and clicks the mouse. Next, one of the three operating states "Locked," "Hard," or "Soft" is selected to be assigned to each switch. A user selects the operating state to be assigned by aligning the pointer with a check box adjacent to the operating state and clicking the mouse to insert a check mark. In FIG. 22, for example, the hard state of the front suspension FS is assigned to the left switch LSW and the hard state of the rear suspension RS is assigned to the right switch RSW.

In order to set the coordinated mode, a user inserts a check mark into a checkbox adjacent to "Front/rear coordinated." The user then inserts a check mark adjacent to an operating state of each of the front suspension FS and the rear suspension RS. FIG. 23, for example, illustrates a case in which the fully rigid state is assigned to the left switch LSW and the fourth full suspension is assigned to the right switch RSW. When the task of assigning switches is finished, the user aligns the pointer and clicks a Selection button. The settings are stored in the external device 60 and the display returns to the custom settings screen.

If the left switch LSW or the right switch RSW will not be used, then it is acceptable not to assign an operating state to the switch that will not be used. Here, too, if the Select button is selected, then the settings are completed and the display returns to the custom settings screen.

If it determines that S-operation Settings is not selected in step P40 of FIG. 20, then the control device 180 proceeds to step P42. In step P42, the control device 180 determines if D-operation settings has been selected. If D-operation settings have been selected, then the control device 180 proceeds to step S43 and executes D-operation settings. Setting screens for the D-operation settings are shown in FIGS. 24 and 25. FIG. 24 shows a D-operation settings screen indicating a state in which the independent mode is selected. FIG. 25 shows a D-operation settings screen indicating a state in which the coordinated mode is selected.

The screen used for the D-operation settings is basically the same as the screen used for the S-operation settings. In the independent mode shown in FIG. 24 an individual operating state of the front suspension FS or the rear suspension RS is assigned to each of the left switch LSW and the right switch RSW in the same manner as for the short push settings, and in the coordinated mode shown in FIG. 25 a combination of operating states of the front suspension FS and the rear suspension RS is assigned to each of the left switch LSW and the right switch RSW. In FIG. 24, for example, the independent mode of the D-operation of the switches is set such that the hard state of the front suspension FS is assigned to the left switch LSW and the hard state of the rear suspension RS is assigned to the right switch RSW. Meanwhile, in FIG. 25, for example, the coordinated mode of the D-operation of the switches is set such that the first full suspension combination is assigned to the left switch LSW and the second full suspension combination is assigned to the right switch RSW.

If it determines that D-operation Settings is not selected in step P42 of FIG. 20, then the control device 180 proceeds to step P44. In step P44, T-operation settings are executed. Setting screens for the D-operation settings are shown in FIGS. 26 and 27. FIG. 26 shows a T-operation settings screen indicating a state in which the independent mode is selected. FIG. 27 shows a T-operation settings screen indicating a state in which the coordinated mode is selected.

The screen used for the T-operation settings is basically the same as the screen used for the S-operation settings. In the independent mode shown in FIG. 26 an individual operating state of the front suspension FS or the rear suspension RS is assigned to each of the left switch LSW and the right switch RSW in the same manner as for the S-operation settings and the D-operation settings, and in the coordinated mode shown in FIG. 27 a combination of operating states of the front suspension FS and the rear suspension RS is assigned to each of the left switch LSW and the right switch RSW. In FIG. 26, for example, the independent mode of the T-operation of the switches is set such that the soft state of the front suspension FS is assigned to the left switch LSW and the soft state of the rear suspension RS is assigned to the right switch RSW. Meanwhile, in FIG. 27, for example, the coordinated mode of the T-operation of the switches is set such that the first hard tail combination is assigned to the left switch LSW and the second hard tail combination is assigned to the right switch RSW.

If the control device 180 determines that Operation Determination Setting has been selected in step P33 of FIG. 20, then the control device 180 proceeds from step P33 to step P45. In step P45, the control device 180 displays the operation determination setting screen shown in FIG. 28 on the display unit 62. When the T-operation/D-operation determination setting is finished, the control device 180 proceeds to step P34. The operation determination time setting screen sets a maximum value of a determination time T3 for the D-operation and the T-operation of the switches. In this embodiment, as shown in FIG. 28, the determination time T can be set to one of five values ranging from 300 ms to 700 ms in intervals of 100 ms. FIG. 28 depicts a case in which the determination time T is set to 600 ms. With this setting, the control device 180 determines that an S-operation has occurred if a switch is operated once within a 600-ms period, that a D-operation has occurred if a switch is operated twice within a 600-ms period, and that a T-operation has occurred if a switch is operated three times within a 600-ms period.

Although in this embodiment various operating states of the suspensions can be set can be set in response to the various switches, it is also acceptable to, for example, contrive the setting control such that a suspension is set to be stiffer the more times a switch is operated per unit time is or such that a suspension is set to be stiffer the fewer times a switch is operated per unit time such a case, it is possible that a relationship between an operation count of a switch and a stiffness change of a suspension will be easier for a user to understand. One example is to set the operating device such that a single operation changes only the front suspension FS to a locked state and such that a double operation releases the locked state of only the front suspension FS. Another example is to set the operating device such that both the front suspension FS and the rear suspension RS are changed to the locked state in response to a to a triple operation, both the front suspense ion FS and the rear suspension RS are changed to the hard state in response to a double operation, and both the front suspension FS and the rear suspension RS are changed to the soft state in response to a single operation.

In each of the previously explained embodiments, an operating state of at least one of the front suspension FS and the rear suspension RS can be changed with a first manual operation and a second manual operation that constitute different operating methods, Consequently, simple switches, such as single-contact switches, can be used. Since the first manual operation and the second manual operation constitute different operating methods, a user can change the suspension to a desired operating state using simple switches having a single contact.

Also, using a first manual operation, a second manual operation, and a third operation constituting different operation times or different operation counts per unit time of a single operating device, at least one of a front suspension FS and a rear suspension RS can be changed among different operating states.

Although an embodiment of the present invention has been presented heretofore, the present invention is not limited to this embodiment and various modifications can be made without departing from the scope of the invention as defined by the claims.

(a) Although in the previously explained embodiment the left switch LSW and the right switch RSW can be selectively assigned to operate in independent mode or coordinated mode, the present invention is not limited to such an assignment scheme. For example, it is acceptable to transmit setting information for operating in the independent mode and the coordinated mode from an external device to the operating devices and contrive the apparatus such that the independent mode and the coordinated mode can be selected at an electric component control unit. In such a case, it is acceptable, for example, to indicate the independent mode and the coordinated mode on the cycling computer 40 and to use the operating button 89 to select the independent mode or the coordinated mode from the cycling computer 40. Then, when each of the operating devices is operated, the suspension control section controls the operating states of the suspensions in accordance with the selected mode, i.e., independent mode or coordinated mode.

(b) It is acceptable to contrive the previously explained embodiment such that the electric component control units enter an energy conserving mode, i.e., a sleep mode, when the gear shifting units and operating devices have not been operated for a prescribed amount of time. A user can set an amount of time to serve as a reference for transitioning to the energy saving mode by using the selecting unit 61.

(l) Although in the previously explained embodiment there are three perating states of the suspension, namely a locked state, a hard state, and a soft state, it is acceptable for the operating states of the suspension to include such aspects as a suspension height, a suspension stiffness, a suspension compression damping force, a suspension rebound damping force, and an damping three occurring when a rider pedals.

(d) Although in the previously explained embodiment the prescribed amount of time used to determine if a first long push operation or a second long push operation has occurred is selected from among a plurality of predetermined times, it is acceptable to contrive the apparatus such that a user can set a numerical value of the prescribed amount of time using the selecting unit 61. Also, similarly to the determination time T3, it is acceptable to contrive the apparatus such that a user sets the prescribed amount of time using the selecting unit 61.

(e) Although the previously explained embodiments present cases in which two switches are provided, it is acceptable for only one switch to be provided. In such a case, only information related to the switch is indicated on the display device 62.

(f) Although in the previously explained embodiments the front derailleur and the rear derailleur are electrically driven and controlled, it is also acceptable for the derailleurs to be driven with a shift cable. In such a case, it is preferable for the left switch LSW and the right switch RSW to be arranged in a region D that is indicated with hatching in FIG. 3 and lies between a retraction lever 50*a* and a release lever 50*b* of a manually operated gearshift unit 50. More specifically, the left switch LSW and the right switch RSW are each arranged near a position where the operation range of the respective retraction lever 50a ends. As a result, the operating state of the suspension can be changed quickly immediately after a gear change operation.

Also, with the left switch LSW and right switch RSW arranged near and in front of the release levers 50b, the operating state of a suspension can be changed immediately before a gear shift operation and a user can proceed directly to the gear shift operation after changing the operating state of the suspension.

It is preferable to arrange the left switch LSW and the right switch RSW such that each is near a position where the operating range of the corresponding retraction lever 50a ends and near a position just in front of the corresponding release lever 50b such that both of the effects mentioned above can be realized.

Additionally, it is also possible to contrive the apparatus such that the operating directions of the left switch LSW and the right switch RSW are different than the operating directions of the retraction levers 50a and the release levers 50b, e.g., perpendicular to the operating directions of the retraction levers 50a and the release levers 50b. In this way, accidental operation of the left switch LSW and the right switch RSW can be prevented.

(g) Although in the previously explained embodiments the front suspension FS and the rear suspension RS have the same number of operating states, it is acceptable for the front suspension and the rear suspension to have different numbers of operating states. For example, the front suspension might have a locked state, a hard state, and a soft state and the rear suspension might have only a locked state and a hard state.

(h) Although in the previously explained embodiments the suspension is controlled by the electric power supply controller 11 or 160, the present invention is not limited to such an arrangement. It is acceptable to provide the suspension control in the electric component control unit of any one of the electric components or to provide the suspension control independently of the electric components.

(i) the previously explained embodiments, it is acceptable for the first or left switch LSW and the second or right switch RSW to be connected to the electric power supply controller 11 serving as a control means with electric power lines and communication lines separate from the electric power lines or with electric power lines configured to serve as both electric power lines and as communication lines, i.e., electric power line communication (PLC).

(j) Although in the previously explained embodiments the switches are single-contact switches, any type of switch is acceptable so long as it can output two different values. For example, it is acceptable to use a switch comprising a hole element and a magnet.

(k) Although in the previously explained embodiments minimum values of the first determination time T1 and the second determination time T2 are set, it is acceptable to contrive the apparatus such that both a minimum value and a maximum value are set for each of the first determination time T1 and the second determination time T2. In such a case, it is acceptable to set the maximum value of the first determination time and the minimum value of the second determination time to different values.

(l) Although in the previously explained embodiments the switches are single-contact switches, any type of switch is acceptable so long as it can output two different values. For example, it is acceptable to use a switch comprising a hole element and a magnet.

(m) Although in the previously explained embodiments a minimum value is not set for the determination time of a short push operation, in another embodiment it is acceptable to set a minimum value of the short push determination time such that the suspension control section does not change the operating state of a suspension when a switch is operated for an amount of time shorter than the minimum value. Such a setting can help prevent the operating state of a suspension from being changed due to inadvertent contact with a switch or vibrations.

(n) In another embodiment, it is acceptable for a plurality of operating methods to be defined in terms of a combination of operation times and operation counts per unit time. For example, a first manual operation can be set to constitute two operations per unit time with each of the two operations being equal to or longer than a first amount of time set in advance as an operating time per single operation, and a second manual operation can be set to constitute two operations per unit time with each of the two operations being equal to or longer than a second amount of time set in advance as an operating time per single operation.

(o) Although the previously explained embodiments have three operating methods, it is acceptable to use four or more operating methods.

(p) Although in the previously explained embodiments the setting information is transmitted to the suspension control section when it is determined that the Finalize button has been selected in step P4 or P34, it is also acceptable to contrive the apparatus such that the setting information is transmitted to the suspension control section when the Select button of each setting screen is selected.

Thus, the foregoing descriptions of the embodiments according to the present invention are provided for illustration only, and not for the purpose of limiting the invention as defined by the appended claims and their equivalents.

What is claimed is:

1. A bicycle suspension control apparatus configured to control a bicycle suspension including front and rear suspensions each having a plurality of operating states, the apparatus comprising:
   a user operating device including a single-contact switch having a single contact;
   a controller configured to set both the front and rear suspensions to a first operating state in response to a first manual operation of the single-contact switch, and set both the front and rear suspensions to a second operating state in response to a second manual operation of the single-contact switch, the second manual operation being performed in a different operating manner of the single-contact switch than the first manual operation.

2. The bicycle suspension control apparatus according to claim 1, wherein
   the controller is further configured such that the first operating state is astute in which the suspension cannot expand and contract and the second operating state is a state in which the suspension can expand and contract.

3. The bicycle suspension control apparatus according to claim 1, wherein
   the controller is further configured such that the first operating state is a state in which the suspension is free to expand and contract and the second operating state is a state in which the suspension locked to prevent expansion and contraction.

4. The bicycle suspension control apparatus according to claim 1, wherein
   the controller sets the bicycle suspension to the first operating state based on first operation time per single operation of the single contact switch for the first manual operation and sets the bicycle suspension to the second operating state based on a second operation time per single operation of the single contact switch for the second manual operation, with the first and second operation times being different.

5. The bicycle suspension control apparatus according to claim 4, wherein
the controller is further configured such that the first operation time of the first manual operation is shorter than the second operation time of the second manual operation.

6. The bicycle suspension control apparatus according to claim 5, wherein
the controller is further configured to control the bicycle suspension to a third operating state in response to a third manual operation having a third operation time that is different from the first and second operation times of the first and second manual operations.

7. The bicycle suspension control apparatus according to claim 6, wherein
the controller is further configured such that the third operating state is a state that is different from both the first operating state and the second operating state.

8. The bicycle suspension control apparatus according to claim 6, wherein
the controller is further configured such that the third operation time of the third operation is longer than the first operation time of the first manual operation and shorter than the second operation time of the second manual operation.

9. The bicycle suspension control apparatus according to claim 8, wherein
the controller is further configured such that the third operating state is a state that is different from both the first operating state and the second operating state.

10. The bicycle suspension control apparatus according to claim 6, wherein
the controller is further configured such that the first operating state is a state in which the suspension cannot expand and contract and the second operating state is a state in which the suspension can expand and contract.

11. The bicycle suspension control apparatus according to claim 6, wherein
the controller is further configured such that the first operating state is astute in which the suspension is free to expand and contract and the second operating state is a state in which the suspension locked to prevent expansion and contraction.

12. The bicycle suspension control apparatus according to claim 1, wherein
the controller sets the bicycle suspension to the first operating state based on first operation count per prescribed amount of time of the single contact switch for the first manual operation and sets the bicycle suspension to the second operating state based on a second operation count per prescribed amount of time of the single contact switch for the second manual operation, with the first and second operation counts being different.

13. The bicycle suspension control apparatus according to claim 12, wherein
the controller is further configured such that the first operation count of the first manual operation is smaller than the second operation count of the second manual operation.

14. The bicycle suspension control apparatus according to claim 13, wherein
the controller is further configured to control the bicycle suspension to a third operating state in response to a third operation having a third operation count that is different from the first and second operation counts of the first and second manual operations.

15. The bicycle suspension control apparatus according to claim 14, wherein
the controller is further configured such that the third operating state is a state that is different from both the first operating state and the second operating state.

16. The bicycle suspension control apparatus according to claim 14, wherein
the controller is further configured such that the third operation count of the third operation is larger than the first operation time of the first manual operation and smaller than the second operation time of the second manual operation.

17. The bicycle suspension control apparatus according to claim 16, wherein
the controller is further configured such that the third operating state is a state that is different from both the first operating state and the second operating state.

18. The bicycle suspension control apparatus according to claim 14, wherein
the controller is further configured such that the first operating state is a state in which suspension cannot expand and contract and the second operating state is a state in which the suspension can expand and contract.

19. The bicycle suspension control apparatus according to claim 14, wherein
the controller is further configured such that the first operating state is a state in which the suspension is free to expand and contract and the second operating state is a state in which the suspension locked to prevent expansion and contraction.

* * * * *